US012630751B2

(12) United States Patent
Bartholomew et al.

(10) Patent No.: US 12,630,751 B2
(45) Date of Patent: May 19, 2026

(54) TWO STAGE METHODS FOR PROCESSING ADHESIVES AND RELATED COMPOSITIONS

(71) Applicant: Avery Dennison Corporation, Mentor, OH (US)

(72) Inventors: Eric L. Bartholomew, Mill Hall, PA (US); William L. Bottorf, Mill Hall, PA (US); Kyle R. Heimbach, Millmont, PA (US); Brandon S. Miller, Lock Haven, PA (US); Michael T. Waterman, Chardon, OH (US); Michael T. Zajaczkowski, Bellefonte, PA (US); Qiang Luo, State College, PA (US); Andrew P. Full, State College, PA (US); Christopher E. Kohler, S. Williamsport, PA (US)

(73) Assignee: Avery Dennison Corporation, Mentor, OH (US)

( * ) Notice: Subject to any disclaimer, the term of this patent is extended or adjusted under 35 U.S.C. 154(b) by 180 days.

(21) Appl. No.: 18/634,544

(22) Filed: Apr. 12, 2024

(65) Prior Publication Data

US 2024/0263055 A1 Aug. 8, 2024

Related U.S. Application Data

(62) Division of application No. 17/656,033, filed on Mar. 23, 2022, now Pat. No. 12,065,588, which is a
(Continued)

(51) Int. Cl.

*B01J 19/18* (2006.01)
*B01J 19/00* (2006.01)
(Continued)

(52) U.S. Cl.

CPC .......... *C09J 133/08* (2013.01); *B01J 19/006* (2013.01); *B01J 19/0066* (2013.01);
(Continued)

(58) Field of Classification Search

CPC ...... B01J 19/123; B01J 19/0066; B01J 19/18; B01J 2219/00711; B01J 2219/00943; C08F 2/48

See application file for complete search history.

(56) References Cited

U.S. PATENT DOCUMENTS 3,252,950 A 5/1966 Terenzi et al.
3,697,402 A 10/1972 Clifton et al.
(Continued)

FOREIGN PATENT DOCUMENTS

CN 102037091 4/2011
CN 103476816 12/2013
(Continued)

OTHER PUBLICATIONS

Invitation to Restrict or Pay Additional Fees of the IPEA dated Mar. 13, 2018 issued in corresponding IA No. PCT/US2017/018568 filed Feb. 20, 2017.
(Continued)

*Primary Examiner* — Lessanework Seifu

(57) ABSTRACT

Methods for forming melt processable, actinic radiation polymerizable and crosslinkable adhesives are described. In certain versions, the adhesives or pre-adhesive compositions include two initiators and are polymerized and/or crosslinked by exposure to actinic radiation such as UV light or electron beam radiation. Also described are pre-adhesive compositions including polymerizable monomers, articles including the adhesives, and various methods and systems
(Continued)

related to the adhesives and their application. In addition, various apparatuses are described for polymerizing or cross-linking the compositions.

8 Claims, 13 Drawing Sheets

Related U.S. Application Data division of application No. 17/109,815, filed on Dec. 2, 2020, now Pat. No. 11,312,884, which is a division of application No. 16/532,027, filed on Aug. 5, 2019, now Pat. No. 11,091,675, which is a division of application No. 15/437,003, filed on Feb. 20, 2017, now Pat. No. 10,414,953.

(60) Provisional application No. 62/297,170, filed on Feb. 19, 2016.

(51) Int. Cl.

| | |
|---|---|
| ***B01J 19/08*** | (2006.01) |
| ***B01J 19/12*** | (2006.01) |
| ***C08F 2/01*** | (2006.01) |
| ***C08F 2/48*** | (2006.01) |
| ***C08F 2/50*** | (2006.01) |
| ***C08F 2/54*** | (2006.01) |
| ***C09J 4/06*** | (2006.01) |
| ***C09J 133/08*** | (2006.01) |

(52) U.S. Cl.

CPC ........... *B01J 19/085* (2013.01); *B01J 19/123* (2013.01); *B01J 19/18* (2013.01); *C08F 2/01* (2013.01); *C08F 2/48* (2013.01); *C08F 2/50* (2013.01); *C08F 2/54* (2013.01); *C09J 4/06* (2013.01); *B01J 2219/00094* (2013.01); *B01J 2219/00768* (2013.01); *B01J 2219/00779* (2013.01); *B01J 2219/08* (2013.01)

(56) References Cited

U.S. PATENT DOCUMENTS 3,993,549 A 11/1976 Bush et al.
4,118,595 A 10/1978 Pfahnl et al.
4,232,058 A 11/1980 Dow et al.
4,279,590 A 7/1981 Dow et al.
4,291,087 A 9/1981 Warburton, Jr.
4,713,273 A 12/1987 Freedman
4,740,532 A 4/1988 May, Jr. et al.
4,912,169 A 3/1990 Whitmire et al.
4,916,184 A 4/1990 Clark
4,948,819 A 8/1990 Green et al.
4,952,711 A 8/1990 Jacobine et al.
5,028,661 A 7/1991 Clark et al.
5,096,963 A 3/1992 Blain
5,102,924 A 4/1992 Williams et al.
5,178,710 A 1/1993 Hikmet et al.
5,217,654 A 6/1993 Buckley
5,268,396 A 12/1993 Lai
5,298,554 A 3/1994 Rehmer et al.
5,324,078 A 6/1994 Bane
5,342,582 A 8/1994 Horn et al.
5,358,976 A 10/1994 Dowling et al.
5,521,227 A 5/1996 Palazzotto et al.
5,585,415 A 12/1996 Gorzalski et al.
5,683,741 A 11/1997 Seng et al.
5,770,331 A 6/1998 Olsen et al.
5,847,021 A 12/1998 Tortorello et al.
5,894,050 A 4/1999 Camps et al.
5,932,113 A 8/1999 Kurdi et al.
5,958,468 A 9/1999 Kunkel et al.
6,008,264 A 12/1999 Ostler et al.
6,014,488 A 1/2000 Shustack
6,045,953 A 4/2000 Ohe et al.
6,107,361 A 8/2000 Tortorello et al.
6,344,532 B1 2/2002 Kim et al.
6,358,354 B1 3/2002 Patil
6,359,742 B1 3/2002 Canty et al.
6,392,725 B1 5/2002 Harada et al.
6,432,475 B1 8/2002 Yamamoto et al.
6,444,368 B1 9/2002 Hikmet et al.
6,514,373 B1 2/2003 Hill et al.
6,517,661 B2 2/2003 Hill et al.
6,524,881 B1 2/2003 Tandy et al.
6,551,439 B1 4/2003 Hill et al.
6,624,915 B1 9/2003 Kirkpatrick et al.
6,632,535 B1 10/2003 Buazza et al.
6,636,291 B2 10/2003 Van De Witte et al.
6,649,259 B1 11/2003 Hu et al.
6,652,281 B1 11/2003 Eckhardt et al.
6,677,402 B2 1/2004 Gaddam et al.
6,692,978 B2 2/2004 Tandy et al.
6,734,032 B2 5/2004 Tandy et al.
6,743,852 B2 6/2004 Dershem et al.
6,767,974 B1 7/2004 Keoshkerian et al.
6,821,455 B2 11/2004 Kornfield et al.
6,836,371 B2 12/2004 Lai et al.
6,855,226 B2 2/2005 Hill et al.
6,897,915 B1 5/2005 Lavrentovich et al.
6,939,428 B2 9/2005 Hill et al.
7,008,675 B2 3/2006 Kornfield et al.
7,009,668 B2 3/2006 Van De Witte et al.
7,038,670 B2 5/2006 Liang et al.
7,074,295 B2 7/2006 Bellafore et al.
7,094,618 B2 8/2006 Tandy et al.
7,157,535 B2 1/2007 Herr et al.
7,176,044 B2 2/2007 Forray et al.
7,179,509 B2 2/2007 Kornfield et al.
7,229,517 B2 6/2007 Bellafore et al.
7,232,540 B2 6/2007 Gould et al.
7,232,595 B2 6/2007 Coykendall et al.
7,238,543 B2 7/2007 Tandy et al.
7,256,221 B2 8/2007 Coykendall et al.
7,271,947 B2 9/2007 Liang et al.
7,300,688 B2 11/2007 Wilderbeek et al.
7,339,579 B2 3/2008 Richter et al.
7,372,480 B1 5/2008 Lavrentovich et al.
7,416,707 B2 8/2008 Imai
7,517,925 B2 4/2009 Dershem et al.
7,528,404 B2 5/2009 Musa et al.
7,601,786 B2 10/2009 Gillett et al.
7,605,190 B2 10/2009 Moszner et al.
7,691,479 B2 4/2010 Schmatloch et al.
7,745,535 B2 6/2010 Schmidt et al.
7,763,330 B2 7/2010 Lub et al.
7,781,493 B2 8/2010 Baikerikar et al.
7,786,183 B2 8/2010 Baikerikar et al.
7,795,364 B2 9/2010 Herr et al.
7,799,884 B2 9/2010 Herr et al.
7,806,016 B2 10/2010 Shimizu et al.
7,824,740 B2 11/2010 Kawanishi et al.
7,837,941 B2 11/2010 Harding et al.
7,851,254 B2 12/2010 Forray et al.
7,939,161 B2 5/2011 Allam et al.
7,940,000 B2 5/2011 Koshiyama et al.
7,955,696 B2 6/2011 Baikerikar et al.
7,956,151 B2 6/2011 Schmatloch et al.
7,978,302 B2 7/2011 Peeters et al.
8,022,437 B2 9/2011 Koyama
8,040,049 B2 10/2011 Kimura et al.
8,080,299 B2 12/2011 Baikerikar et al.
8,080,609 B2 12/2011 Schmatloch
8,083,321 B2 12/2011 Krawczyk et al.
8,147,974 B2 4/2012 Baikerikar et al.
8,183,305 B2 5/2012 Neffgen et al.
8,194,044 B2 6/2012 Richter et al.
8,236,480 B2 8/2012 Locascio et al.
8,273,801 B2 9/2012 Baikerikar et al.
8,298,368 B2 10/2012 Schmatloch et al.
8,304,061 B2 11/2012 Feldman et al.
8,349,410 B2 1/2013 Huang et al.

(56) References Cited

U.S. PATENT DOCUMENTS

| | | | |
|---|---|---|---|
| 8,378,052 | B2 | 2/2013 | Harvey et al. |
| 8,415,010 | B2 | 4/2013 | Liu et al. |
| 8,420,704 | B2 | 4/2013 | Hillmyer et al. |
| 8,603,630 | B2 | 12/2013 | Takahashi |
| 8,686,060 | B2 | 4/2014 | Smith et al. |
| 8,735,506 | B2 | 5/2014 | Hammond et al. |
| 8,808,811 | B2 | 8/2014 | Kolb et al. |
| 8,980,967 | B2 | 3/2015 | Krepski et al. |
| 9,012,127 | B2 | 4/2015 | Bowman et al. |
| 9,175,098 | B2 | 11/2015 | Nielsen et al. |
| 9,243,172 | B2 | 1/2016 | Krepski et al. |
| 9,469,794 | B2 | 10/2016 | Liu et al. |
| 9,546,305 | B2 | 1/2017 | Hammond et al. |
| 9,644,063 | B2 | 5/2017 | Miller et al. |
| 9,670,295 | B2 | 6/2017 | Palasz et al. |
| 9,738,740 | B2 | 8/2017 | Lester et al. |
| 9,890,305 | B2 | 2/2018 | Suwa et al. |
| 10,287,463 | B2 | 5/2019 | Behling et al. |
| 10,287,464 | B2 | 5/2019 | Gower et al. |
| 10,407,525 | B2 | 9/2019 | Lester et al. |
| 10,414,953 | B2 | 9/2019 | Bartholomew et al. |
| 10,526,511 | B2 | 1/2020 | Hartinger et al. |
| 10,640,595 | B2 | 5/2020 | Bartholomew et al. |
| 10,941,321 | B2 | 3/2021 | Behling et al. |
| 11,117,994 | B2 | 9/2021 | Lester et al. |
| 11,267,999 | B2 | 3/2022 | Gower et al. |
| 11,312,884 | B2 | 4/2022 | Bartholomew et al. |
| 11,608,399 | B2 | 3/2023 | Behling et al. |
| 2002/0098608 | A1 | 7/2002 | Tandy et al. |
| 2002/0168501 | A1 | 11/2002 | Sigel et al. |
| 2003/0003688 | A1 | 1/2003 | Tandy et al. |
| 2003/0015688 | A1 | 1/2003 | Hikmet |
| 2003/0059188 | A1 | 3/2003 | Baker et al. |
| 2003/0096111 | A1 | 5/2003 | Husemann et al. |
| 2003/0166985 | A1 | 9/2003 | Patil et al. |
| 2004/0029044 | A1 | 2/2004 | Severance et al. |
| 2004/0048988 | A1 | 3/2004 | Gillett et al. |
| 2004/0077744 | A1 | 4/2004 | Naylor et al. |
| 2004/0082683 | A1 | 4/2004 | Karim et al. |
| 2004/0161876 | A1 | 8/2004 | Tandy et al. |
| 2004/0191420 | A1 | 9/2004 | Rearick et al. |
| 2004/0257508 | A1 | 12/2004 | Van de Witte et al. |
| 2005/0000643 | A1 | 1/2005 | Bellafore et al. |
| 2005/0070655 | A1 | 3/2005 | Van Den Bergen et al. |
| 2005/0119366 | A1 | 6/2005 | Moy et al. |
| 2005/0136077 | A1 | 6/2005 | Yahiaoui et al. |
| 2005/0165164 | A1 | 7/2005 | Moeller et al. |
| 2005/0174412 | A1 | 8/2005 | Codos et al. |
| 2005/0182148 | A1 | 8/2005 | Gaud et al. |
| 2005/0208285 | A1 | 9/2005 | Lyons et al. |
| 2005/0250906 | A1 | 11/2005 | Husemann |
| 2006/0079011 | A1 | 4/2006 | Tandy et al. |
| 2006/0086448 | A1 | 4/2006 | Verstegen et al. |
| 2006/0110596 | A1 | 5/2006 | Palasz et al. |
| 2006/0142408 | A1 | 6/2006 | Liu et al. |
| 2006/0229377 | A1 | 10/2006 | Bublewitz et al. |
| 2007/0072098 | A1 | 3/2007 | Hikmet |
| 2007/0077402 | A1 | 4/2007 | Sigel et al. |
| 2007/0142589 | A1 | 6/2007 | Rogers et al. |
| 2007/0179240 | A1 | 8/2007 | Chalmers et al. |
| 2007/0187656 | A1 | 8/2007 | Evans et al. |
| 2007/0249794 | A1 | 10/2007 | Evans et al. |
| 2007/0257238 | A1 | 11/2007 | Misura et al. |
| 2007/0258238 | A1 | 11/2007 | Handsaker |
| 2007/0265391 | A1 | 11/2007 | Yang et al. |
| 2007/0295616 | A1 | 12/2007 | Harding et al. |
| 2008/0054171 | A1 | 3/2008 | Bonn et al. |
| 2008/0093776 | A1 | 4/2008 | Williams |
| 2008/0094556 | A1 | 4/2008 | Van Der Zande et al. |
| 2008/0106002 | A1 | 5/2008 | Feldman et al. |
| 2008/0214712 | A1 | 9/2008 | Passade et al. |
| 2008/0250130 | A1 | 10/2008 | Li et al. |
| 2008/0311404 | A1 | 12/2008 | Diggins |
| 2008/0312354 | A1 | 12/2008 | Krawczyk et al. |
| 2009/0015771 | A1 | 1/2009 | Hikmet et al. |
| 2009/0015930 | A1 | 1/2009 | Hikmet et al. |
| 2009/0093584 | A1 | 4/2009 | Gelles et al. |
| 2009/0096136 | A1 | 4/2009 | Hawker et al. |
| 2009/0208553 | A1 | 8/2009 | Kemp et al. |
| 2009/0288771 | A1 | 11/2009 | Farrell et al. |
| 2010/0068231 | A1 | 3/2010 | Favre et al. |
| 2010/0109317 | A1 | 5/2010 | Hoffmuller |
| 2010/0215659 | A1 | 8/2010 | Ladet |
| 2010/0255239 | A1 | 10/2010 | Hammond et al. |
| 2011/0026118 | A1 | 2/2011 | Seesselberg et al. |
| 2011/0111350 | A1 | 5/2011 | Lakshmi et al. |
| 2011/0118372 | A1 | 5/2011 | Lester et al. |
| 2011/0319558 | A1 | 12/2011 | Rehnberg et al. |
| 2012/0021134 | A1 | 1/2012 | Kolb et al. |
| 2012/0277341 | A1 | 11/2012 | Smith et al. |
| 2013/0059971 | A1 | 3/2013 | Miller et al. |
| 2013/0081687 | A1 | 4/2013 | Wu et al. |
| 2013/0094789 | A1 | 4/2013 | Hoffman et al. |
| 2013/0103157 | A1 | 4/2013 | Kourtis et al. |
| 2013/0109262 | A1 | 5/2013 | Zhou |
| 2013/0237626 | A1 | 9/2013 | Bishop et al. |
| 2014/0008319 | A1 | 1/2014 | Buxton-Dakides |
| 2014/0039083 | A1 | 2/2014 | Krepski et al. |
| 2014/0061027 | A1 | 3/2014 | Polwart et al. |
| 2014/0065325 | A1 | 3/2014 | Guo et al. |
| 2014/0066539 | A1 | 3/2014 | Tobing et al. |
| 2014/0158296 | A1 | 6/2014 | Wigdorski et al. |
| 2014/0174650 | A1 | 6/2014 | Brizius |
| 2014/0179820 | A1 | 6/2014 | Prenzel et al. |
| 2014/0228463 | A1 | 8/2014 | Gupta et al. |
| 2014/0329958 | A1 | 11/2014 | Lester et al. |
| 2014/0360975 | A1 | 12/2014 | Hustad et al. |
| 2015/0105488 | A1 | 4/2015 | Madsen et al. |
| 2015/0152298 | A1 | 6/2015 | Krepski et al. |
| 2015/0299475 | A1 | 10/2015 | Porosa et al. |
| 2015/0367600 | A1 | 12/2015 | Niimi et al. |
| 2016/0023980 | A1 | 1/2016 | Chisholm et al. |
| 2016/0068718 | A1 | 3/2016 | Suwa et al. |
| 2016/0168298 | A1 | 6/2016 | Woods et al. |
| 2016/0289513 | A1 | 10/2016 | Behling et al. |
| 2017/0174902 | A1 | 6/2017 | Epple et al. |
| 2017/0217791 | A1 | 8/2017 | McNulty et al. |
| 2017/0227407 | A1 | 8/2017 | Yeo et al. |
| 2018/0051194 | A1 | 2/2018 | Palasz |
| 2018/0243463 | A1 | 8/2018 | Chatterjee et al. |
| 2020/0299965 | A1 | 9/2020 | Tang et al. |

FOREIGN PATENT DOCUMENTS

| | | |
|---|---|---|
| CN | 103998481 | 8/2014 |
| CN | 201480056971.6 | 10/2014 |
| CN | 105131849 | 12/2015 |
| CN | 105164187 | 12/2015 |
| CN | 106459617 | 2/2017 |
| CO | 2017/0011546 | 3/2018 |
| DE | 102005043222 | 3/2007 |
| EP | 1130070 | 8/2002 |
| EP | 1477511 | 11/2004 |
| EP | 1595930 | 11/2005 |
| GB | 2491643 | 12/2012 |
| JP | 10-147632 | 6/1998 |
| JP | 11-335648 | 12/1999 |
| JP | 2000-015754 | 1/2000 |
| JP | 2000-017121 | 1/2000 |
| JP | 2000-303047 | 10/2000 |
| JP | 2001-261726 | 9/2001 |
| JP | 2001-288229 | 10/2001 |
| JP | 2011-184678 | 9/2011 |
| JP | 2012-072235 | 4/2012 |
| JP | 2014-517095 | 7/2014 |
| JP | 2014-152294 | 8/2014 |
| JP | 2014-213572 | 11/2014 |
| JP | 2015-040257 | 3/2015 |
| JP | 2015-086371 | 5/2015 |
| KR | 10-2003-0072566 | 9/2003 |
| KR | 10-2010-0137520 | 12/2010 |
| KR | 2013-0130927 | 12/2013 |
| KR | 1020130130927 | 12/2013 |
| KR | 10-2014-0012674 | 2/2014 |

(56) References Cited

FOREIGN PATENT DOCUMENTS

| | | |
|---|---|---|
| KR | 1020140030206 | 3/2014 |
| WO | 99/10443 | 3/1999 |
| WO | 01/94211 | 6/2002 |
| WO | 2005/119366 | 12/2006 |
| WO | 2008/052131 | 5/2008 |
| WO | 2009/048968 | 4/2009 |
| WO | 2009/117654 | 9/2009 |
| WO | 2012/126724 | 9/2012 |
| WO | 2012/168694 | 12/2012 |
| WO | 2014/186265 | 11/2014 |
| WO | 2015/143290 | 9/2015 |
| WO | 2016/100251 | 6/2016 |
| WO | 2016/153592 | 9/2016 |
| WO | 2016/177861 | 11/2016 |
| WO | 2016/179076 | 11/2016 |

OTHER PUBLICATIONS

Written Opinion of the IPEA dated Apr. 26, 2018 issued in corresponding IA No. PCT/US2017/018568 filed Feb. 20, 2017.
International Search Report dated Mar. 11, 2019 issued in corresponding IA No. PCT/US2018/066510 filed Dec. 19, 2018.
International Preliminary Report on Patentability dated Apr. 30, 2019 issued in corresponding IA No. PCT/US2017/058284 filed Oct. 25, 2017.
International Preliminary Report on Patentability dated Jun. 23, 2020 issued in corresponding IA No. PCT/US2018/066510 filed Dec. 19, 2018.
International Search Report and Written Opinion dated Jan. 23, 2018 issued in corresponding IA No. PCT/US2017/058284 filed Oct. 25, 2017.
International Preliminary Report on Patentability dated Oct. 4, 2016 issued in corresponding IA No. PCT/US2015/023591 filed Mar. 31, 2015.
International Search Report and Written Opinion dated Jul. 9, 2015 issued in corresponding IA No. PCT/US2015/023591 filed Mar. 31, 2015.
Rudolph et al., "Selective crosslinking or addressing of individual domains within block copolymer nanostructures," European Polymer Journal 80, 2016, pp. 317-331.
An et al., "Multifunctional Linear Methacrylate Copolymer Polyenes Having Pendant Vinyl Groups: Synthesis and Photoinduced Thiol-Ene Crosslinking Polyaddition," Journal of Polymer Science, Part A: Polymer Chemistry, 2014, 52, pp. 572-581.
Dipasquale et al., "Controlled architecture for improved macromolecular memory within polymer networks," Current Opinion in Biotechnology, 2016, 40, pp. 170-176.
Invitation to Pay Additional Fees dated May 17, 2017 issued in corresponding IA No. PCT/US2017/018568 filed Feb. 20, 2017.
International Search Report and Written Opinion dated Jul. 4, 2017 issued in corresponding IA No. PCT/US2017/018568 filed Feb. 20, 2017.
International Preliminary Report on Patentability dated Jul. 10, 2018 issued in corresponding IA No. PCT/US2017/018568 filed Feb. 20, 2017.
Hu, Yuhong et al., "Block Copolymer-Based Hot Melt Pressure-Sensitive Adhesives," Handbook of Pressure-Sensitive Adhesives and Products, copyright 2009, pp. 3-1-3-2.
Leibfarth et al., "External Regulation of Controlled Polymerizations," Angew. Chem. Int. Ed. 2013, 52, 199-210, 2013.
Liu et al., "Preparation and Characterization of Photoreactive Copolymers Containing Curable Pendants for Positive Photoresist," Journal of Applied Polymer Science, vol. 80, pp. 328-333, 2001.
Gauthier et al., "Synthesis of Functional Polymers by Post-Polymerization Modification," Angew. Chem. Int. Ed. 2009, 48, 48-58, 2009.

TWO STAGE METHODS FOR PROCESSING ADHESIVES AND RELATED COMPOSITIONS

CROSS-REFERENCE TO RELATED APPLICATION

The present application is a division of U.S. application Ser. No. 17/656,033 filed Mar. 23, 2022, which is a divisional of U.S. application Ser. No. 17/109,815 filed Dec. 2, 2020, now U.S. Pat. No. 11,312,884, which is a divisional of U.S. application Ser. No. 16/532,027 filed Aug. 5, 2019, now U.S. Pat. No. 11,091,675 which is a divisional of U.S. application Ser. No. 15/437,003 filed Feb. 20, 2017, now U.S. patent Ser. No. 10/414,953, and further claims the benefit of U.S. Provisional Patent Application No. 62/297,170 filed Feb. 19, 2016, all of which are incorporated herein by reference in their entireties.

FIELD

The present subject matter relates to methods for preparing adhesives, and particularly melt processable adhesives that are polymerized and crosslinked by exposure to actinic radiation. In many embodiments, the adhesives are produced from controlled architecture polymers. The present subject matter also relates to adhesive and pre-adhesive compositions, articles utilizing the adhesives, and systems for processing the adhesives.

BACKGROUND

UV curable polymeric systems such as various adhesives and coatings are known in the art. Typically, exposure to UV light for a sufficient duration and intensity results in crosslinking of the polymer and in certain systems polymerization of monomers or other species. Curing often results in toughening or hardening of the system.

Although a wide range of equipment and practices are known for curing polymeric systems, most if not all are limited in flexibility and/or can only be used in association with specific polymeric systems having particular curing requirements. Accordingly, a need exists for new strategies for curing adhesive systems and new adhesive compositions that can be prepared, stored if desired, and selectively applied or further processed.

SUMMARY

The difficulties and drawbacks associated with previous approaches are addressed in the present subject matter as follows.

In one aspect, the present subject matter provides a method of forming a melt processable adhesive. The method comprises providing a composition that includes at least one monomer having one or more ethylenically unsaturated bonds, a first actinic radiation initiator, and a second actinic radiation initiator, wherein the second initiator is substantially non-photoactive at activation wavelength(s) of the first initiator. The method also comprises at least partially polymerizing the composition by exposing the composition to radiation having wavelengths corresponding to the activation wavelength(s) of the first initiator. The method additionally comprises at least partially crosslinking the composition to thereby form the adhesive by exposing the composition to radiation having wavelengths corresponding to the activation wavelength(s) of the second initiator. In this method, the composition is free of solvents.

In another aspect, the present subject matter provides a method of forming an adhesive by two stages involving exposure to actinic radiation. The method comprises providing a composition including at least one monomer, a first actinic radiation initiator, and a second actinic radiation initiator, wherein the second initiator is substantially non-photoactive at activation wavelength(s) of the first initiator. The method also comprises at least partially polymerizing the composition by exposing the composition to radiation having wavelengths corresponding to the activation wavelength(s) of the first initiator. The method additionally comprises at least partially crosslinking the composition to thereby form the adhesive by exposing the composition to radiation having wavelengths corresponding to the activation wavelength(s) of the second initiator. At least one of the first and the second initiators is a polymer having a photoinitiator moiety along the polymer backbone.

In yet another aspect, the present subject matter provides a composition comprising at least one monomer having one or more ethylenically unsaturated bonds in which the composition can be readily processed to form an adhesive. The composition also comprises a first actinic radiation initiator for at least partially polymerizing the at least one monomer to form a pre-adhesive, the first initiator being activated at a first activation wavelength(s). The composition additionally comprises a second actinic radiation initiator for at least partially crosslinking the pre-adhesive, the second initiator being activated at a second activation wavelength(s) and the second initiator being substantially non-photoactive at the first activation wavelength(s).

In still another aspect, the present subject matter provides an acrylate melt processable pre-adhesive composition comprising at least one acrylate polymer. The composition also comprises an actinic radiation initiator for at least partially crosslinking the polymer, the initiator being a photoinitiator moiety along the polymer backbone. The pre-adhesive composition prior to activation of the initiator exhibits a viscosity within a range of from 1,000 cps to 80,000 cps at a temperature within a range of from 110° C. to 180° C.

In yet another aspect, the present subject matter provides an apparatus for polymerizing and/or crosslinking an adhesive or pre-adhesive composition. The apparatus comprises a reaction vessel defining an interior chamber and including at least one collar providing access to the interior chamber. The apparatus also comprises at least one probe assembly supported by the collar. The probe assembly includes (i) an emitter for emitting light that polymerizes and/or crosslinks the composition, (ii) a light tube extending from the emitter and at least partially disposed within the interior chamber of the reaction vessel, (iii) adjustable positioning provisions for governing position of the light tube within the interior chamber of the reaction vessel, and (iv) a cover disposed at a distal end of the light tube, wherein the cover is transparent or substantially transparent to passage of light emitted from the emitter.

In still another aspect, the present subject matter provides an apparatus for polymerizing and/or crosslinking an adhesive or pre-adhesive composition. The apparatus comprises a reaction vessel defining an interior chamber and at least one sight glass incorporated in a wall of the vessel and providing visual access to the interior chamber. The apparatus also comprises at least one probe assembly adjacent the sight glass. The probe assembly includes an emitter for emitting light that polymerizes and/or crosslinks the composition. The probe assembly is positioned such that light emitted from the emitter is directed to the sight glass and passes into the interior chamber of the reaction vessel. The sight glass is transparent or substantially transparent to passage of light emitted from the emitter.

In another aspect, the present subject matter provides an apparatus for polymerizing and/or crosslinking an adhesive or pre-adhesive composition. The apparatus comprises a reaction vessel defining an interior chamber, and including mixing provisions having at least one blade. The apparatus also comprises at least one baffle disposed within the interior chamber of the reaction vessel. The baffle includes at least one emitter for emitting light that polymerizes and/or crosslinks the composition.

DETAILED DESCRIPTION OF THE EMBODIMENTS

Figure 1:
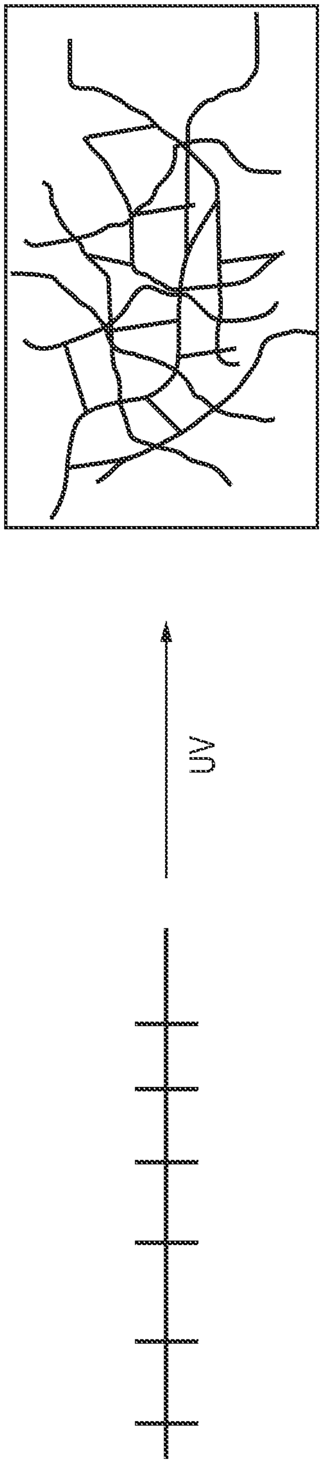
FIG. 1 is a schematic illustration depicting a conventional polymer including various reactive functional groups and upon exposure to UV radiation, formation of a conventional randomly crosslinked network.

The present subject matter relates to methods for preparing adhesives and particularly actinic radiation polymerizable and crosslinkable melt processable adhesives. In many embodiments of the present subject matter, the methods are directed to forming adhesives produced from controlled architecture polymers (referred to as "CAPs" herein). The present subject matter also relates to adhesives and pre-adhesives formed by the methods noted herein. The present subject matter also relates to articles containing the adhesives prepared by the methods described herein. In addition, the present subject matter relates to equipment and systems for preparing and/or processing the adhesives and pre-adhesives.

Before turning attention to the details of the present subject matter and the numerous embodiments thereof, it is instructive to consider several terms and their definitions as used herein. The terms "polymerize" or "polymerizing" refer to a process of reacting monomers together in a chemical reaction to form polymer. And the terms "crosslink" or "crosslinking" refer to a process of forming bonds that link one polymer chain to another polymer chain. The bonds may be covalent bonds or ionic bonds. The term "crosslink" can refer to the bond itself. The terms "cure" and "curing" refer to the terms "crosslink" or "crosslinking" and are used interchangeably.

In many embodiments of the present subject matter methods, upon polymerizing and crosslinking of certain compositions, and particularly those that include CAPs, the resulting adhesives exhibit enhanced adhesive properties such as relatively high peel strength and shear strength. These enhanced adhesive properties are believed to at least partially result from (i) a majority of crosslinking involving functional group(s) of the polymers being located at or near terminal ends of the polymer chains, and (ii) an absence or only a minority of crosslinking involving functional group(s) located within interior regions of the polymer chains. The crosslinked network that results from the methods as described herein is referred to herein as an "enhanced terminally linked network" or ETLN. As described in greater detail herein, formation of an ETLN allows for lower adhesive coatweights, lower viscosities, and better adhesive performance, among various other advantages and benefits. These and other aspects of the methods, the CAP based adhesives and ETLNs, and related articles are described in greater detail herein.

Although in many embodiments, the present subject matter methods utilize adhesives including CAPs, it will be appreciated that the present subject matter also includes methods of polymerizing and crosslinking non-CAP based adhesives. These and other aspects of the methods, the non-CAP based adhesives polymerized and crosslinked by such methods, and related articles are described in greater detail herein.

The present subject matter also provides pre-adhesive compositions that include one or more monomers which upon polymerization form an adhesive base polymer. The pre-adhesive composition also includes at least two actinic radiation initiators. In many embodiments at least one of these initiators, and in particular embodiments both the first and the second initiators, polymerize with the monomers to form the adhesive. These and other aspects are described herein.

The present subject matter also provides a block copolymer composition comprising at least one of an (AB) diblock copolymer, (ABA) triblock copolymer, an $-(AB)_n-$ multiblock copolymer, and combinations thereof. The present subject matter also provides a pressure sensitive adhesive derived from a block copolymer composition comprising at least one of an (AB) diblock copolymer, (ABA) triblock copolymer, an -$(AB)_n$- multiblock copolymer, and combinations thereof. The present subject matter further provides a method of preparing a block copolymer (and/or a method of preparing a pressure sensitive adhesive derived from a block copolymer composition) comprising at least one of an (AB) diblock copolymer, (ABA) triblock copolymer, an -$(AB)_n$- multiblock copolymer, and combinations thereof. The present subject matter also provides use of a block copolymer (and/or a pressure sensitive adhesive derived from a block copolymer) composition comprising at least one of an (AB) diblock copolymer, (ABA) triblock copolymer, an -$(AB)_n$- multiblock copolymer, and combinations thereof. The block copolymer of the present subject matter may be an acrylic block copolymer. In other embodiments, the block copolymer of the present subject matter is preferably an acrylic block copolymer.

Adhesives

The actinic radiation polymerizable and crosslinkable adhesives of the present subject matter comprise a melt adhesive or pre-adhesive composition, a first actinic radiation initiator that in many applications serves to polymerize the adhesive and a second actinic radiation initiator that is useful for crosslinking the adhesive. In many embodiments, the second initiator is substantially non-photoactive at activation wavelengths of the first initiator.

In many embodiments, the actinic radiation polymerizable and crosslinkable melt adhesive includes controlled architecture polymers or CAPs. In many embodiments of the present subject matter, the CAPs are those described in one or more co-pending applications owned by the Applicant which include US 2011/0118372; US 2013/0059971; and US 2014/0329958. Details of particular embodiment polymers are provided herein. However, it will be understood that the present subject matter includes the use of any of the polymers described in these applications.

In certain embodiments, upon activation of the first initiator to form a pre-adhesive, the pre-adhesive exhibits a viscosity within a range of from 1,000 cps to 80,000 cps at a temperature within a range of from 110° C. to 180° C. In particular embodiments, the pre-adhesive exhibits a viscosity within a range of from 30,000 cps to 40,000 cps at a temperature within a range of from 120° C. to 140° C. In other embodiments, the pre-adhesive exhibits a viscosity within a range of from 40,000 cps to 50,000 cps at a temperature within a range of from 120° C. to 140° C. And, in still other embodiments, the pre-adhesive exhibits a viscosity within a range of from 1,000 cps to 15,000 cps at a temperature within a range of from 110° C. to 130° C.

It will be understood that in no manner is the present subject matter limited to adhesives or pre-adhesives exhibiting these particular viscosities. It is contemplated that the present subject matter may also include adhesives or pre-adhesives exhibiting these viscosities at temperatures less than 110° C., and/or at temperatures greater than 180° C. Moreover, it is contemplated that the present subject matter may also provide adhesives or pre-adhesives that exhibit viscosities less than 1,000 cps and/or greater than 80,000 cps at a wide array of temperatures.

The present subject matter adhesives and/or pre-adhesive compositions comprise two or more actinic radiation initiators and in particular embodiments two or more UV activated initiators. Although not wishing to be bound by any particular theory, it is believed that in many embodiments of the present subject matter, one or both initiator(s), when irradiated with actinic radiation and particularly UV light, is excited to a higher energy state and abstracts a hydrogen atom from a functional group on the polymer, thereby generating a free radical that is available for further reaction, such as for example free radical addition crosslinking with another polymer chain or functional group on the polymer. However, it will be understood that the present subject matter includes the use of nearly any type of initiator and is not limited to those that abstract hydrogen atoms. For example, a variety of initiators are known that decompose or cleave into free radicals upon exposure to light, and more particularly UV radiation.

A variety of initiators are known and can potentially be incorporated in the present subject matter adhesives, including benzophenone, acetophenone, acyl phosphine, thioxanthone, derivatives of these compounds, and similar compounds. Each compound functions as a photoinitiator by absorbing energy within the UV region of the electromagnetic spectrum.

Several types of photoinitiators that absorb in the near UV region of the spectrum are known, including acylphosphine oxide-type photoinitiators, redshifted benzophenone-type photoinitiators, and thioxanthone-type photoinitiators. Many of these may be suitable for use with the present subject matter compositions.

Commercially available acylphosphine oxide-type photoinitiators include "Lucirin TPO" (2,4,6-trimethylbenzoyl-diphenylphosphine oxide) and "Lucirin TPO-L" (liquid), sold by BASF, and "BAPO" (bis 2,6-dimethoxybenzoyl!-2,4-trimethylpentylphosphine oxide), sold by Ciba.

The so-called "redshifted benzophenone-type photoinitiators" are benzophenone derivatives in which one or more hydrogen atoms is replaced by a functional group or groups which cause a redshift (towards longer wavelengths) in the UV absorption spectrum of the molecule, as compared to the UV absorption spectrum of benzophenone. An example is "QUANTACURE BMS" (4-benzoyl-4'-methyldiphenylsulfide).

Commercially available thioxanthone-type photoinitiators include "Quantacure ITX," which is believed to be a mixture of 2-isopropyl- and 4-isopropylthioxanthone isomers.

Other suitable photoinitiators can be identified by those skilled in the art and utilized in the present subject matter. Moreover, if the adhesive is compounded without a pigment, photoinitiators that absorb at shorter UV wavelengths can be employed, including less expensive, simpler photoinitiators such as unsubstituted acetophenone, benzil, benzophenone, quinone, and thioxanthone.

Combinations of any of the noted photoinitiators can potentially be used for the first initiator, the second initiator, and/or both initiators.

In certain embodiments of the present subject matter, particular initiators are used which are in the form of polymerizable monomers. During formation of the polymer(s) of the adhesives, the first and/or second initiators are incorporated in the adhesive polymers and can be subsequently activated by UV irradiation. Thus, at least one of the first and second initiators is polymerizable with the monomers that form the adhesive and/or its polymers. In these embodiments, the first initiator is a polymerizable photoinitiator and initiates polymerization of the monomers that form the adhesive. Polymerization of the monomers may be initiated either directly or indirectly via sensitization, synergists, or co-initiator mechanisms. Nonlimiting examples of polymerizable photoinitiators include acyl phosphines, thioxanthone derivatives, camphorquinone and/or related derivatives, and combinations thereof. Examples of acyl phosphines include TPO, TPO-L, and BAPO. However, it will be understood that the present subject matter includes other agents that absorb UV radiation and which may be suitable for use as the first initiator. For example, it is contemplated that the UV absorbing material can be in the form of a distinct agent that is added to the system, bound to a polymer, or formed in-situ by an association of materials or agents in the system. This latter strategy is referred to herein as a "photoinitiator free" technique and can be based upon complexes such as a charge transfer complex or a donor-acceptor complex.

In these embodiments, the second initiator is in the form of a polymerizable monomer having a photoinitiator moiety attached or coupled thereto. Generally, the polymerizable monomer can be any monomer suitable for forming the polymeric matrix of the adhesive system. Nonlimiting examples of such monomers include acrylate and methacrylate monomers. Additional examples of potentially suitable monomers are described herein.

The photoinitiator moiety of this version of the second initiator must not be appreciably photoactive at wavelengths at which the first initiator activates. Thus, the photoinitiator moiety is generally inactive at the activation wavelengths of the first initiator.

Generally, the photoinitiator moiety of the polymerizable monomer version of the second initiator is a hydrogen abstractor type initiator. For example, the moiety may include a derivative of benzophenone. However, the present subject matter includes cleavage type photoinitiators. Furthermore, the present subject matter includes activation via sensitizers, co-initiators, and/or synergists. As previously described for the first polymerizable initiator, the second initiator in the form of a polymerizable monomer having a photoinitiator moiety can be in the form of a distinct agent that is added to the system, bound to a polymer, or formed in-situ by an association of materials or agents in the system in a photoinitiator-free technique such as based upon complexes such as a charge transfer complex or a donor-acceptor complex.

As noted, in many embodiments the adhesives utilize a first initiator and a second initiator which are activated at different wavelengths. This enables activation of the first initiator without activating the second initiator. The initiators are both activated by actinic radiation and in many embodiments by UV radiation, i.e., electromagnetic radiation having a wavelength in a range of from about 100 nm to about 500 nm. In certain embodiments, the first initiator is activated at wavelengths within a range of from 200 nm to 500 nm, particularly from 300 nm to 500 nm, and more particularly from 350 nm to 500 nm. And, the second initiator is activated at wavelengths within a range of from 100 nm to 400 nm, particularly from 200 nm to 400 nm, and more particularly from 200 nm to 375 nm. Generally, the wavelength(s) at which the first initiator is activated is (are) different from those at which activation occurs for the second initiator.

Thus, in many versions of the present subject matter, one or both of the first and second initiators is/are in the form of a polymer having a photoinitiator moiety along the polymer backbone. And, in certain embodiments, one or both of the first and second initiators is/are in the form of polymerizable monomers and/or oligomers having a photoinitiator moiety.

The first and/or second initiators can also be activated by exposure to electron beam radiation. It is also contemplated that one initiator can be activated by exposure to UV radiation and another initiator can be activated by exposure to electron beam radiation.

The total amount of initiators added to the polymer in preparing the adhesive depends on several factors, including the amount of pigment and/or other agents added, the coat weight (thickness) of the adhesive on the substrate, the web speed during curing, and the type and cost of the initiators used. In many embodiments, the initiator is the most expensive ingredient in the adhesive. Therefore, ordinarily it is desirable to minimize the amount of initiator added to the polymer, so long as enough initiator is included to achieve the desired end properties of the resulting composition.

In certain embodiments of the present subject matter, a pigment or other coloring agent(s) is added to the composition, typically prior to crosslinking, in order to render the adhesive opaque, and/or to impart color to the adhesive. Opaque pigments such as for example titanium dioxide typically are added by the coating industry precisely because of their high hiding power. However, their presence generally interferes with UV initiated crosslinking of the adhesive polymer. In the present subject matter, however, initiators that absorb in the near UV region of the spectrum can be employed with pigmented (as well as non-pigmented) formulations, thereby avoiding interference with UV initiated crosslinking of the adhesive.

The amount of pigment added to the compounded polymer in a given formulation, like the amount of initiator, depends on a number of factors, including the desired degree of opacity, desired degree of cure, whether other fillers are present, the type and amount of photoinitiator present, and cost considerations.

For the present subject matter, where pigmented adhesive compositions are utilized, UV initiated crosslinking can be facilitated by decreasing the amount of titanium dioxide present (or other pigment) and/or increasing the amount of initiator. As a practical matter, though, pigment loadings above about 15 parts pigment per hundred parts polymer (or, if the copolymer is tackified, about 15 parts pigment per 100 parts polymer plus tackifier) are less preferred than lower pigment loadings. UV initiated crosslinked, pressure sensitive adhesive compositions having high cohesive strength can be prepared in accordance with the present subject matter with higher pigment loadings, but require higher (and more expensive) initiator concentrations and/or longer crosslinking times.

In some embodiments, the adhesive composition is formulated with a colored (non-white) pigment.

Generally, yellow and red pigments do not substantially interfere with photoinitiators that absorb in the UV region. Hence, adhesives compounded with such pigments can be UV crosslinked to a high cohesive strength by using UV-activatable, photoinitiators. Blue pigments tend to absorb strongly in at least part of the near UV region. By minimizing the amount of blue pigment that is added, however, UV crosslinked adhesives can be prepared in the manner described herein.

In addition to the pigment and initiator(s), in some embodiments, the polymer is further compounded with a tackifier. In certain embodiments such as if the adhesive is a pressure sensitive adhesive, tackifier may be added to improve the tack of the pressure sensitive adhesive.

A variety of tackifiers, many of which are well known in the industry, can potentially be used in the practice of the present subject matter. Representative, nonlimiting examples of such tackifiers include hydrocarbon resins and rosin resins. Such tackifiers include, but are not limited to, rosins and rosin derivatives including rosinous materials that occur naturally in the oleoresin of pine trees, as well as derivatives thereof including rosin esters, modified rosins such as fractionated, hydrogenated, dehydrogenated, and polymerized rosins, modified rosin esters and the like.

Generally, up to about 45 parts tackifier per hundred parts polymer are added. However, it will be appreciated that the present subject matter includes the use of lesser amounts and/or greater amounts of tackifiers.

A wide range of tackifiers are commercially available including, but not limited to, Foral® 85 (glycerol ester of a highly stabilized rosin), Foral® 105 (pentaerythritol ester of a hydrogenated rosin), Stabilite ester 10, and Pentalyn® H, manufactured and sold by Hercules, Inc., PE Estergum and the like, manufactured by Arizona Chemical Co., and Sylvatac® 40N, Sylvatac® RX, Sylvatac® 95 and the like, manufactured by Sylvachem Corporation.

There may also be employed as tackifiers terpene resins which are hydrocarbons of the formula C10H16, occurring in most essential oils and oleoresins of plants, and phenol modified terpene resins like alpha pinene, beta pinene, dipentene, limonene, myrecene, bornylene, camphene, and the like. Various aliphatic hydrocarbon resins like Escorez™ 1304, manufactured by Exxon Chemical Co., and aromatic hydrocarbon resins based on C9's, C5's, dicyclopentadiene, coumarone, indene, styrene, substituted styrenes and styrene derivatives and the like can also be used.

Hydrogenated and partially hydrogenated resins such as Regalrez™ 1018, Regalrez™ 1033, Regalrez™ 1078, Regalrez™ 1094, Regalrez™ 1126, Regalrez™ 3102, Regalrez™ 6108, etc., produced by Hercules Corporation, can be used as tackifiers in the present subject matter as well. Various terpene phenolic resins of the type SP 560, manufactured and sold by Schenectady Chemical Inc., Nirez 1100, manufactured and sold by Reichold Chemical Inc., and Piccolyte® S-100, manufactured and sold by Hercules Corporation, are particularly useful tackifiers for the present subject matter. Further, various mixed aliphatic and aromatic resins, such as Hercotex AD 1100, manufactured and sold by Hercules Corporation, can also be used as tackifiers.

Additionally, the melt processable, actinic radiation polymerizable and crosslinkable adhesive compositions may comprise one or more inhibitors. A viable free radical scavenger may be present to prevent premature gelation, either in storage or preparation for coating, especially in the case of hot melt adhesive compositions. Inhibitors comprising phenolic compounds are one class of such materials that may be used in the present subject matter, including, for example, 4-methoxyphenol (MEHQ, methyl ether of hydroquinone), hydroquinone, 2-methylhydroquinone, 2-t-butylhydroquinone, t-butyl catechol, butylated hydroxy toluene, and butylated hydroxy anisole and the like and combinations thereof. Other inhibitors that may be used include phenothiazine and anaerobic inhibitors, such as the NPAL type inhibitors (tris-(N-nitroso-N-phenylhydroxylamine) aluminum salt) from Albemarle Corporation, Baton Rouge, La. Combinations of inhibitors may be used.

The adhesives of the present subject matter may further comprise one or more conventional adjuvants such as fillers, plasticizers, diluents, and the like. Combinations of one or more of these components can be used including combinations with pigment(s) and/or tackifier(s). If desired, diluents such as plasticizers may be added in the place of a portion of the tackifier in order to alter the properties of tackiness and cohesive strength.

Generally, the melt processable, actinic radiation polymerizable and crosslinkable adhesives include at least 95% solids, in many embodiments at least 98% solids, in particular embodiments at least 99% solids, and in certain versions at least 99.5% solids.

As noted, in many embodiments of the present subject matter the adhesives are in the form of pressure sensitive adhesives. A description of pressure sensitive adhesives and their characteristics may be found in *Encyclopedia of Polymer Science and Engineering*, Vol. 13. Wiley-Interscience Publishers (New York, 1988). Additional description of pressure sensitive adhesives and their characteristics may be found in *Encyclopedia of Polymer Science and Technology*, Vol. 1, Interscience Publishers (New York, 1964).

Controlled Architecture Polymers (CAPs)

In particular embodiments, the melt processable, actinic radiation polymerizable and crosslinkable adhesives of the present subject matter are produced from controlled architecture polymers. In many embodiments the polymers are acrylic polymers.

In many embodiments of the present subject matter, the melt processable, actinic radiation polymerizable and crosslinkable adhesives that include controlled architecture polymers have one or more reactive functional groups incorporated in select blocks or regions of the polymer at designated concentrations within those regions. As noted, in many embodiments the polymers are acrylic polymers. The reactive functional groups can be incorporated in the polymers by one or more polymerizable monomers as described herein. Thus, a polymerizable monomer and/or comonomer as described herein may constitute one or more reactive functional groups. The present subject matter additionally provides adhesives utilizing the controlled architecture polymers.

Generally, the CAPs comprise at least two blocks or regions different from one another, located anywhere along the polymer backbone or chain, or elsewhere within the polymer. Thus, a CAP as described herein may contain one or more A blocks, one or more B blocks, and one or more C blocks anywhere within the polymer. The preferred polymers may comprise other types of blocks or regions such as D blocks, E blocks . . . etc. In a preferred aspect, particular amounts of reactive functional groups are provided in association with at least two of the blocks, referred as blocks A and B for purposes of convenience. And, in a more preferred aspect, the amounts of reactive functional groups are controlled in the blocks A and B such that the total amount of a reactive functional group is distributed between two blocks, for example blocks A and B, within a certain range of weight ratios. Generally, this ratio is referred to herein as an "apportionment ratio" and is defined as the ratio of the weight percent of a reactive functional group associated with block A to the weight percent of the reactive functional group associated with block B. Generally, a useful range of ratios, i.e. apportionment ratios, for the controlled architecture polymers described herein is from about 1.1:1 to about 10,000:1. In many embodiments, the apportionment ratios of the ordered polymers are from 1.1:1 to 1,000:1, or from 1.1:1 to 100:1. In other embodiments, the apportionment ratios of the ordered polymers are from 6:1 to 10,000:1, or from 6:1 to 1,000:1, or from 6:1 to 100:1, or from 6:1 to 80:1. However, it will be appreciated that the present subject matter includes polymers with one or more reactive functional groups distributed between polymeric blocks at apportionment ratios less than or greater than these ranges. For example, the present subject matter includes polymers as described herein however having apportionment ratios in excess of 10,000:1, such as for example about 50,000:1, about 75,000:1, and about 100,000:1.

The CAPs are preferably formed from (i) monomers of acrylates and/or methacrylates and (ii) polymerizable acrylate comonomers having one or more reactive functional groups. The term "monomer" or "comonomer" as used herein refers to a molecule, starting unit, or chemical species that can bond together to form a polymer. The term also includes a repeating unit within the polymer. As noted, these monomers or comonomers are generally referred to herein as blocks or regions such as "A", "B", and/or "C". The acrylate monomers include C1 to about C20 alkyl, aryl or cyclic acrylates such as methyl acrylate, ethyl acrylate, phenyl acrylate, butyl acrylate, 2-ethylhexyl acrylate, isobornyl acrylate and functional derivatives of these acrylates such as 2-hydroxy ethyl acrylate, 2-chloroethyl acrylate, and the like. These monomers or comonomers typically contain from about 3 to about 20 carbon atoms, and in one embodiment about 3 to about 8 carbon atoms. The methacrylate monomers include C1 to about C20 alkyl, aryl or cyclic methacrylates such as methyl methacrylate, ethyl methacrylate, butyl methacrylate, 2-ethylhexyl methacrylate, phenyl methacrylate, isobornyl methacrylate, and functional derivatives of these methacrylates such as 2-hydroxyethyl methacrylate, 2-chloroethyl methacrylate, and the like. These monomers or comonomers typically contain from about 4 to about 20 carbon atoms, and in one embodiment about 4 to about 8 carbon atoms. Combinations of acrylates and methacrylates can also be used.

Although in many embodiments the CAPs preferably comprise (i) monomers of acrylates and/or methacrylates, and (ii) polymerizable acrylate comonomers, i.e. blocks A and B, the present subject matter includes the use of additional and/or different monomers as blocks in the polymer. Nearly any free radically polymerizable monomer or combination of monomers could be used as blocks A, B, C, D, E, etc. in the controlled architecture polymers described herein. Accordingly, it will be understood that in no way is the present subject matter limited to the CAPs including acrylate and/or methacrylate blocks.

The polymerizable monomers and comonomers can include as reactive functional groups acrylonitrile groups, acrylamide groups, methacrylamide groups, vinyl ester groups, vinyl ether groups, vinyl amide groups, vinyl ketone groups, styrene groups, halogen-containing groups, ionic groups, acid-containing groups, base-containing groups, olefin groups, silane groups, epoxy groups, hydroxyl groups, anhydride groups, and mixtures of two or more groups thereof. It is also contemplated to include silyl groups, carboxyl groups, carbonyl groups, carbonate ester groups, isocyanato groups, amino groups, amide groups, imide groups, mercapto groups, and acetoacetyl groups in any combination and/or in combination with one or more of any of the previously noted groups.

The acrylonitrile groups can include acrylonitrile and alkyl substituted acrylonitriles. The alkyl groups typically contain from 1 to about 20 carbon atoms, and in one embodiment from 1 to about 10 carbon atoms, and in another embodiment from 1 to about 5 carbon atoms. Examples include methacrylonitrile and ethacrylonitrile.

The acrylamide groups can include acrylamide and its derivatives including the N-substituted alkyl and aryl derivatives thereof. These include N-methyl acrylamide, N,N-dimethyl acrylamide, t-octyl acrylamide, N-aminoethyl acrylate, N-aminoethyl methacrylate, and the like.

The methacrylamide groups can include methacrylamide and its derivatives including the N-substituted alkyl and aryl derivatives thereof.

The vinyl ester groups can include vinyl acetate, vinyl propionate, vinyl butyrate, vinyl valerate, vinyl versitate, vinyl isobutyrate, and the like.

The vinyl ether groups can include vinyl ethers having 1 to about 8 carbon atoms including ethylvinyl ether, butylvinyl ether, 2-ethylhexylvinyl ether, and the like.

The vinyl amide groups can include vinyl amides having 1 to about 8 carbon atoms including vinyl pyrrolidone, and the like.

The vinyl ketone groups can include vinyl ketones having 1 to about 8 carbon atoms including ethylvinyl ketone, butylvinyl ketone, and the like.

The styrene groups can include styrene, indene, and substituted styrenes represented by the formula (I):

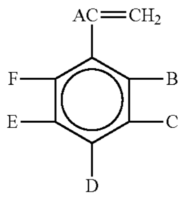

(I)

wherein each of A, B, C, D, E and F is independently selected from hydrogen, C1 to about C4 alkyl or alkoxy groups (especially methyl or methoxy groups,) halogroups (especially chloro), thio, cyano, carboxylic acid or ester, or fluorinated alkyl groups of 1 to about 4 carbon atoms. Examples include methyl styrene (sometimes referred to as vinyl toluene), alpha-methyl styrene, divinylbenzene, chlorostyrene, chloromethyl styrene, and the like.

The halogen-containing groups can include vinyl chloride, vinyl bromide, vinyl fluoride, vinylidene chloride, vinylidene bromide, vinylidene fluoride, halogen substituted propylene monomers, and the like, with vinyl bromide and vinylidene chloride being preferred.

The ionic groups can include sodium vinyl sulfonate, sodium styrene sulfonate, sodium methallyl sulfonate, sodium acrylate, sodium methacrylate, and the like, with sodium vinyl sulfonate, sodium styrene sulfonate and sodium methallyl sulfonate being preferred.

The acid-containing groups can include unsaturated carboxylic acids containing from 3 to about 20 carbon atoms. Preferred groups include acrylic acid, methacrylic acid, vinyl sulfonic acid, itaconic acid, beta carboxyl ethyl acrylate, mono-2-acroyloxypropyl succinate, and the like.

The base-containing groups can include vinyl pyridine and the like.

The olefin groups can include isoprene, butadiene, C2 to about C8 straight chained and branched alpha-olefins such as ethylene, propylene, butylene, isobutylene, diisobutylene, 4-methyl pentene-1, 1-butene, 1-hexene, 1-octene, and the like.

The silane groups can include vinyltrimethoxysilane, vinyltriethoxysilane, vinyltripropoxysilane, vinylmethyldimethoxysilane, vinylmethyldiethoxy-silane, vinylmethyldipropoxysilane, γ-methacryloxypropyl-trimethoxysilane, γ-methacryloxypropyltriethoxysilane, γ-methacryloxypropyl-tripropoxysilane, γ-methacryloxydimethoxysilane, γ-methacryloxypropyl-methyldimethoxysilane, γ-methacryloxypropylmethyldiethoxysilane, γ-methacryl-oxypropylmethyldipropoxysilane, γ-methacryloxymethyl-dimethoxysilane, γ-methacryloxymethyltrimethoxysilane, γ-methacryloxymethyl-triethoxy-silane, (methacryloxymethyl) methyldimethoxysilane, (methacryloxymethyl)-methyldiethoxysilane, γ-methacryloxypropyltriacetoxysilane, γ-acryloxypropyltrimethoxy-silane, γ-acryloxypropyltriethoxy-silane, γ-methacryl-oxymethyldiethoxysilane, γ-acryloxypropyltripropoxy-silane, γ-acryloxypropyl-methyldimethoxysilane, γ-acryloxypropylmethyldiethoxysilane, γ-acryloxypropyl-methyldipropoxysilane, and the like.

The epoxy groups can include for example, glycidyl methacrylate and glycidal acrylate.

The hydroxyl groups can include for example hydroxy ethyl acrylate, hydroxyl ethyl methacrylate, hydroxyl isopropyl acrylates, hydroxyl isopropyl methacrylate, hydroxyl butyl acrylate, hydroxyl butyl methacrylate and the like.

The anhydride groups can include for example maleic anhydride, itaconic anhydride, citraconic anhydride and the like.

In addition to the monomer having functional group(s), the reactive segment may include at least one monomer having the formula (II):

(II)

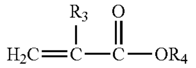

where $R_3$ is H or $CH_3$ and $R_4$ is a branched or unbranched, saturated alkyl group having 4 to 14 carbon atoms. The reactive segment may instead or additionally include at least one monomer having the formula (III):

(III)

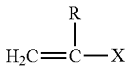

where R is H or $CH_3$ and X represents or contains a functional group capable of crosslinking.

Representative preferred reactive functional groups for incorporating in the polymers described herein include, but are not limited to, acrylic acid, 2-methacryloxyethylphthalic acid (PAMA), and combinations thereof. It will be appreciated that a wide array of other reactive functional groups can be used instead of or in conjunction with any of these reactive functional groups.

The CAPs may exhibit particular distributions of reactive functional groups throughout the polymer. The distribution of each type of reactive functional group incorporated into a polymer can be expressed in terms of a weight ratio of the weight percent amount of that reactive functional group in one block or region, i.e. block A, and the weight percent amount of that reactive functional group in another block or region, i.e. block B. As noted, this weight ratio is referred to herein as the apportionment ratio. For many applications of interest, it is preferred to incorporate greater amounts of reactive functional groups in an A block of a polymer as compared to amounts of reactive functional groups in a different block, i.e. a B block. Therefore, by strategically locating particular blocks having certain weight percentages of specified reactive functional groups within a polymer, precise polymeric architectures can be produced, each with desired loading and placement of functional groups within the polymer. This strategy enables the formation of polymers having particular blocks located at desired regions within the polymer, and the resulting polymer having particular concentrations of functional groups within the desired regions. For example, it may be desired to produce a polymer having a certain combination of blocks, e.g. A, B, and C, and for such polymer to exhibit a relatively high concentration of functional groups within the end regions or other locations of the polymer as compared to other regions such as the interior of the polymer.

The present subject matter is applicable to a wide array of polymer sizes and weights. Typically, the present subject matter is applicable to polymers having a molecular weight of from about 10,000 to about 300,000, preferably from about 50,000 to about 200,000, and most preferably from about 100,000 to about 150,000 g/mol. However, it will be understood that in no way is the present subject matter limited to these molecular weights. It will be appreciated that these molecular weights for the noted polymers are average molecular weights and unless indicated otherwise, are weight average molecular weights.

In certain embodiments, the polymers exhibit relatively narrow ranges of molecular weight and thus have relatively low polydispersity values. Typically, the preferred embodiment polymers exhibit polydispersity (Pdi) values of less than 4.0, preferably less than 3.5, more preferably less than 3.0, more preferably less than 2.5, and most preferably less than 2.0. In certain embodiments, the preferred embodiment polymers exhibit polydispersities of less than 1.5, and as low as about 1.4.

As previously noted, it will also be understood that the CAPs may include two or more different types of reactive functional groups. Thus, different reactive functional groups can be incorporated into one or more end region(s) and/or into one or more interior regions of the polymer(s) of interest. Therefore, a polymer of the present subject matter can include 1, 2, 3, or more different reactive functional groups. And, each group can be defined as apportioned along the polymer in a particular ratio as described herein. For example, a CAP can include a first reactive functional group apportioned between blocks A and B at a first apportionment ratio, and a second reactive functional group apportioned between blocks A and B at a second apportionment ratio different from the first apportionment ratio. Moreover, it is also contemplated that the second reactive functional group or a third reactive functional group could be apportioned between one of blocks A and B, and another block, block C. Alternatively, the second or third reactive functional group could be apportioned between a set of blocks different from blocks A and B, such as blocks C and D.

Representative and non-limiting examples of ranges of glass transition temperatures (Tg) for the controlled architecture polymers typically are from about −60° C. to about −35° C. However, it will be appreciated that the polymers of the present subject matter can exhibit Tg's outside of this range such as less than −60° C. and/or greater than −35° C.

In certain embodiments, the present subject matter utilizes a two-step polymerization process for making a crosslinkable acrylic copolymer having a first segment with reactive functional groups provided by at least one acrylic monomer. A second segment is added to the first segment to form the acrylic copolymer. The second segment does not contain crosslinkable functional groups and is miscible with the first segment.

The reactive segment of the acrylic polymer may be a copolymer derived from one or more of the monomers of the non-reactive segment and at least one polymerizable comonomer having crosslinkable functionality. In one embodiment, the reactive segment comprises at least one monomer having the formula:

(IV)

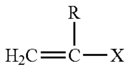

where R is H or $CH_3$ and X represents or contains a functional group capable of crosslinking. The crosslinkable functional group of the reactive segment of the acrylic polymer is not particularly restricted, but may include one or more crosslinkable silyl, hydroxyl, carboxyl, carbonyl, carbonate ester, isocyanato, epoxy, vinyl, amino, amide, imide, anhydride, mercapto, acid, acrylamide and acetoacetyl groups.

Hydroxy functional monomers include, for example, hydroxyl ethyl (meth)acrylate, hydroxyl isopropyl (meth) acylate, hydroxyl butyl (meth)acrylate and the like. Epoxy functional monomers include, for example, glycidyl methacrylate and glycidal acrylate.

The acid containing monomers include unsaturated carboxylic acids containing from 3 to about 20 carbon atoms. The unsaturated carboxylic acids include, among others, acrylic acid, methacrylic acid, itaconic acid, beta carboxy ethyl acrylate, mono-2-acroyloxypropyl succinate, and the like. Anhydride containing monomers include maleic anhydride, itaconic anhydride, citraconic anhydride and the like.

The acrylamides include acrylamide and its derivatives including the N-substituted alkyl and aryl derivatives thereof. These include N-methyl acrylamide, N,N-dimethyl acrylamide, t-octyl acrylamide and the like. The methacrylamides include methacrylamide and its derivatives including the N-substituted alkyl and aryl derivatives thereof. The vinyl esters include vinyl acetate, vinyl propionate, vinyl butyrate, vinyl valerate, vinyl versitate, vinyl isobutyrate and the like. The vinyl ethers include vinyl ethers having 1 to about 8 carbon atoms including ethylvinyl ether, butylvinyl ether, 2-ethylhexylvinyl ether and the like. The vinyl amides include vinyl amides having 1 to about 8 carbon atoms including vinyl pyrrolidone, and the like. The vinyl ketones include vinyl ketones having 1 to about 8 carbon atoms including ethylvinyl ketone, butylvinyl ketone, and the like.

The polymerizable silanes include vinyltrimethoxysilane, vinyltriethoxysilane, vinyltripropoxysilane, vinylmethyldimethoxysilane, vinylmethyldiethoxy-silane, vinylmethyldipropoxysilane, γ-methacryloxypropyl-trimethoxysilane, γ-methacryloxypropyltriethoxysilane, γ-methacryloxypropyl-tripropoxysilane, γ-methacryloxydimethoxysilane, γ-methacryloxypropyl-methyldimethoxysilane, γ-methacryloxypropylmethyldiethoxysilane, γ-methacryl-oxypropylmethyldipropoxysilane, γ-methacryloxymethyl-dimethoxysilane, γ-methacryloxymethyltrimethoxysilane, γ-methacryloxymethyl-triethoxy-silane, (methacryloxymethyl) methyldimethoxysilane, (methacryloxymethyl)-methyldiethoxysilane, γ-methacryloxypropyltriacetoxysilane, γ-acryloxypropyltrimethoxy-silane, γ-acryloxypropyltriethoxy-silane, γ-methacryl-oxymethyldiethoxysilane, γ-acryloxypropyltripropoxy-silane, γ-acryloxypropyl-methyldimethoxysilane, γ-acryloxypropylmethyldiethoxysilane, γ-acryloxypropyl-methyldipropoxysilane, and the like.

In addition to the monomer having functional group(s), the reactive segment may include at least one monomer having the formula:

(V)

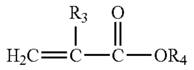

where $R_3$ is H or $CH_3$ and $R_4$ is a branched or unbranched, saturated alkyl group having 4 to 14 carbon atoms.

In one embodiment, the reactive segments include about 40% to about 99% by weight of the one or more monomers of the non-reactive segments. In another embodiment, the reactive segments include about 50% to about 99% by weight of the one or more monomers of the non-reactive segments. In another embodiment, the reactive segments include about 60% to about 99% by weight of the one or more monomers of the non-reactive segments. In another embodiment, the reactive segments include about 70% to about 99% by weight of the one or more monomers of the non-reactive segments. In another embodiment, the reactive segments include about 80% to about 99% by weight of the one or more monomers of the non-reactive segments. In another embodiment, the reactive segments include about 90% to about 99% by weight of the one or more monomers of the non-reactive segments. In another embodiment, the reactive segments include less than about 40% by weight of the one or more monomers of the non-reactive segments. In another embodiment, the reactive segments include more than about 99% by weight of the one or more monomers of the non-reactive segments.

As used herein, the term "molecularly miscible" means a compound or mixture of compounds that exhibit properties in the bulk state that can be observed and/or measured by one of ordinary skill in the art and are indicative of single phase behavior. The term "single phase behavior" refers to behavior or physical properties that are uniform or substantially so. With respect to the acrylic copolymer, the observation of a single Tg is indicative of polymer segment miscibility. The single Tg is intermediate between those of the constituent polymer segments and varies monotonically between these values as the relative amounts of each segment changes. In contrast to single phase behavior evidenced by a molecularly miscible compound or mixture of compounds, at a given temperature, a phase separated compound demonstrates multiple, independent sets of properties that are attributable to the different phases of matter present therein. Such sets of properties include, without limitation, $T_g$, solubility parameters, refractive index, and physical state/phase of matter. Accordingly, the term "phase separated" is defined as two or more substances which are molecularly segregated due to one or more chemical and/or physical properties dependent upon, without limitation, polarity, molecular weight, relative amounts of the polymer segments, and $T_g$ (phase of matter).

Evidence of immiscibility/incompatibility between blocks/segments of a block copolymer, such as an ABA block copolymer, can be confirmed via rheological measurements such as Dynamic Mechanical Analysis (DMA) or Differential Scanning Calorimetry (DSC) and the microstructure determined from microscopy. Miscible polymers exhibit no heterogeneity (i.e., are single phase polymers) in their microstructure. The degree of miscibility/compatibility of a polymer blend can be simply determined by measuring the glass transition temperature(s) in a DMA or DSC can. The presence of two Tgs indicates immiscibility, while the presence of only a single Tg indicates a miscible blend. For block copolymers with mutually incompatible blocks, the microdomains formed by the different blocks exhibit separate/different Tgs, and for incompatible block copolymers separate Tg values are also observed in the DMA and/or DSC plots. For example, for typical styrenic and acrylic ABA block copolymers, the hard A block and the soft B block have sufficiently different solubility parameters such that they are not thermodynamically compatible with each other. As a result, block copolymer-based adhesives have a unique microphase-separated morphology, where A blocks form a hard phase embedded in a soft, continuous phase composed of B blocks. That is, a result of the frequent immiscibility/incompatibility of the two types of blocks present in ABA block copolymers, block copolymers generally exhibit two distinct glass transitions (a DMA bimodal tan 5 curve) at temperatures very close to those of the corresponding homopolymers. The presence of acid, however, in block copolymers such as P(MMA/MAA)-PBA-P (MMA/MAA) raises the Tg of the end block and also enhances the phase separation between the soft acrylate and the hard PMMA domains. Therefore, block copolymers can exhibit morphologies which range from two-phase segregated materials to single-phase homogeneous materials.

Additional details of the controlled architecture polymers including their syntheses are described in the noted commonly-owned applications US 2011/0118372; US 2013/0059971; and US 2014/0329958.

In many embodiments of the present subject matter the CAPs utilized in the adhesives exhibit particular distributions of reactive functional groups within the polymer. In various embodiments, at least 80% of the reactive functional groups are located within the end blocks or terminal ends of the polymer. For purposes of this disclosure, the terms "end blocks" or "terminal blocks" of the polymer refer to end segments of the polymer. These end blocks or terminal ends have a molecular weight less than 50,000 g/mol; in particular embodiments, the molecular weight may be less than 30,000 g/mol, while in still additional particular embodiments, the molecular weight of the end blocks may be less than 10,000 g/mol.

The remaining portion of the reactive functional groups, i.e., up to 20%, are located within one or more interior region(s) of the polymer. In particular embodiments, at least 90% of the reactive functional groups are located within the end blocks or terminal ends and the remaining portion, i.e., up to 10%, is located within one or more interior regions of the polymer. In still other embodiments, at least 95% of the reactive functional groups are located within the end blocks or terminal ends of the polymer. The remaining portion of the reactive functional groups, i.e., up to 5%, are located within one or more interior region(s) of the polymer. And in specific embodiments, at least 99% of the reactive functional groups are located within the end blocks or terminal ends and the remaining portion, i.e., up to 1%, is located within one or more interior regions of the polymer.

Figure 2:
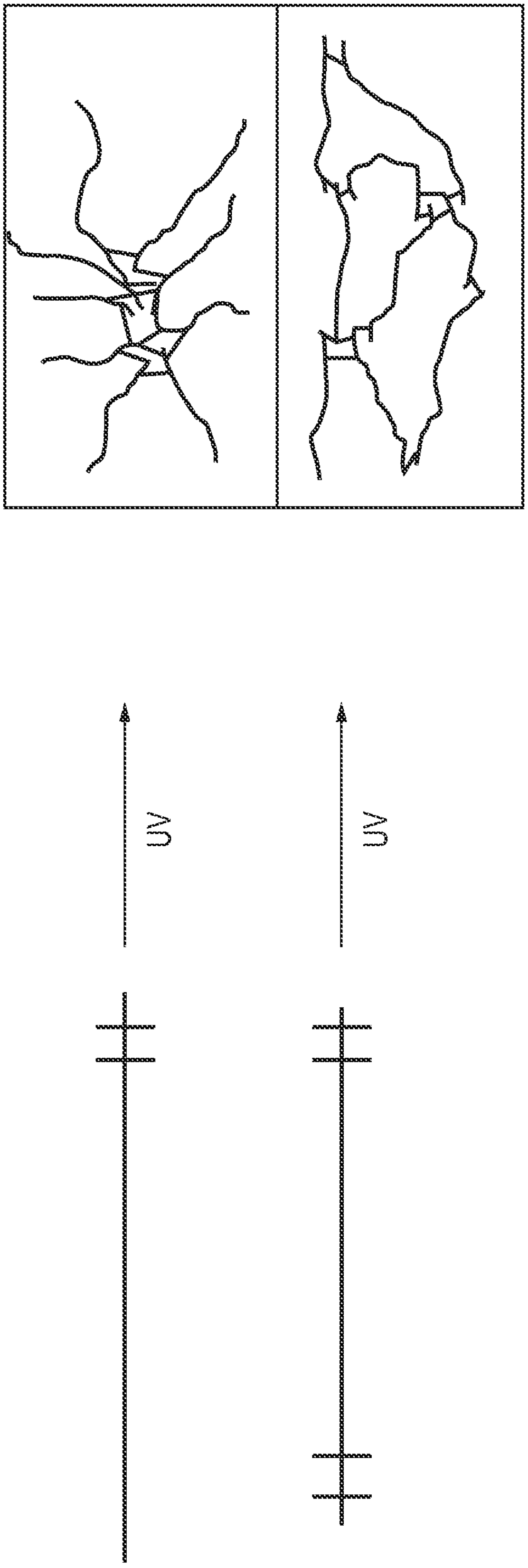
FIG. 2 is a schematic illustration depicting controlled architecture polymers (CAPs) and upon exposure to UV radiation, formation of enhanced terminally linked networks in accordance with the present subject matter.

As previously noted, upon crosslinking of the present subject matter adhesives and formation of an enhanced terminally linked polymeric network, the resulting enhanced adhesive exhibits certain properties that are at least comparable to, and in many instances superior to, those of adhesives utilizing conventional randomly crosslinked polymeric networks. FIG. 1 is a schematic illustration depicting a conventional polymer including various reactive functional groups and upon exposure to UV radiation, formation of a conventional randomly crosslinked network. In FIG. 1, the various functional groups are schematically represented by the vertical line segments located along the polymer chain or backbone which is represented by the horizontal line segment. Upon crosslinking, crosslink bonds involve interior regions of the polymers as a result of many functional groups being located within those interior regions. FIG. 2 is a schematic illustration depicting controlled architecture polymers (CAPs) and upon exposure to UV radiation, formation of an enhanced terminally linked network in accordance with the present subject matter. The CAPs include various functional groups located primarily at or near terminal ends of the polymers. Thus, upon crosslinking, the network that forms is characterized by crosslink bonds primarily at terminal ends of the polymers, and an absence or a relatively minor extent of crosslink bonds involving interior regions of the polymers.

Figure 3:
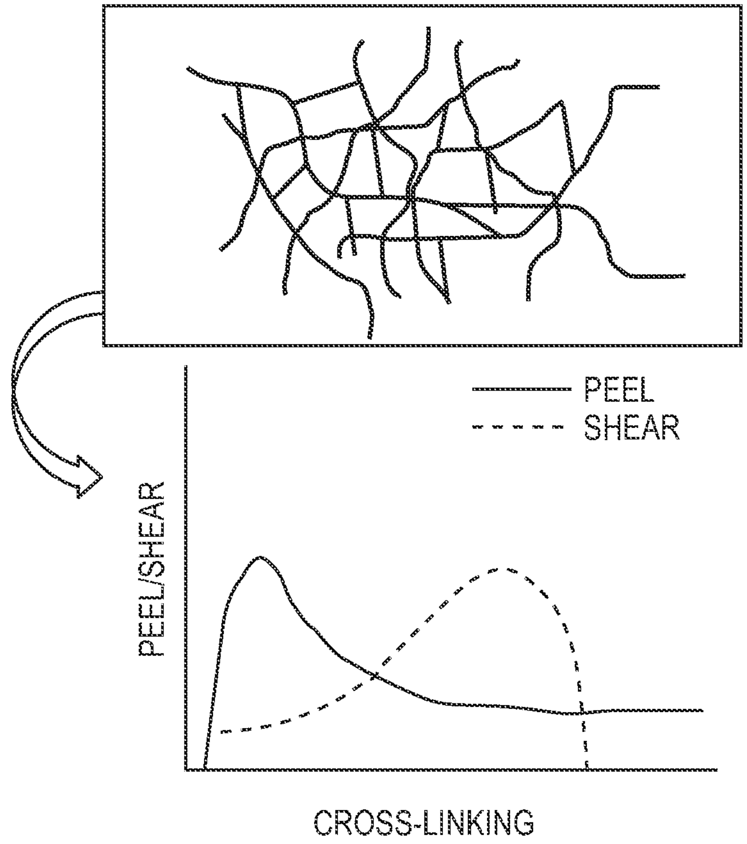
FIG. 3 is a schematic illustration of a conventional randomly crosslinked network and, upon incorporation in an adhesive, typical adhesive properties associated with such network.
Figure 4:
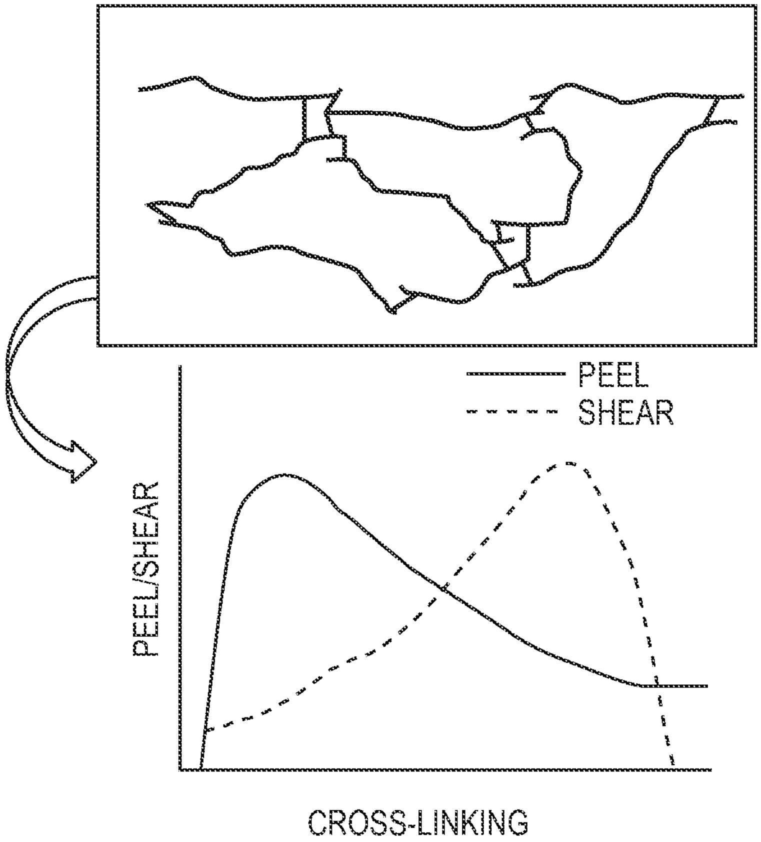
FIG. 4 is a schematic illustration of an enhanced terminally linked network and, upon incorporation in an adhesive, typical adhesive properties associated with such network in the adhesive in accordance with the present subject matter.

The resulting polymeric networks influence and in many regards determine physical properties of the resulting adhesives. FIG. 3 is a schematic illustration of a conventional randomly crosslinked network and, upon incorporation in an adhesive, typical adhesive properties associated with such network. FIG. 4 is a schematic illustration of an enhanced terminally linked network and, upon incorporation in an adhesive, typical adhesive properties associated with such network in the adhesive in accordance with the present subject matter. While the graphs in FIGS. 3 and 4 do not contain values on the y-axis, each graph is presented with the same scale. Accordingly, the networked polymer created though controlled architecture polymerization and depicted in FIG. 4 demonstrates both an improved peel strength (pounds per linear inch) and shear strength (minutes) when compared to the randomly crosslinked network depicted in FIG. 3.

Non-CAPs

In certain embodiments, the melt processable, actinic radiation polymerizable and crosslinkable adhesives of the present subject matter are produced from polymers that are not controlled architecture polymers, or as referred to herein as "non-CAPs." Such adhesives are free of controlled architecture polymers.

In many applications involving non-CAP based adhesives, the polymers are acrylic or alkyl acrylate polymers.

The alkyl acrylates and alkyl methacrylates used in the present subject matter include straight chain alkyl groups, branched chain alkyl groups, or cyclic alkyl groups and, in many embodiments contain from 1 to about 24 carbon atoms. In particular embodiments, the alkyl group contains from 1 to about 12 carbon atoms.

In a particular embodiment, the alkyl acrylate or alkyl methacrylate monomers have from about 4 to about 8 carbon atoms. Such monomers are generally commercially available as commodity chemicals and are less expensive than longer chain alkyl acrylates and methacrylates. They also tend to yield copolymers having a good balance of tack and peel.

A representative, but nonlimiting list of alkyl acrylates and alkyl methacrylates useful in the practice of the present subject matter includes methyl acrylate, ethyl acrylate, n-propyl acrylate, isopropyl acrylate, n-butyl acrylate, isobutyl acrylate, n-amyl acrylate, isoamyl acrylate, n-hexyl acrylate, isohexyl acrylate, cyclohexyl acrylate, isooctyl acrylate, 2-ethylhexyl acrylate, decyl acrylate, lauryl acrylate, stearyl acrylate, isobornyl acrylate, and mixtures thereof, as well as the analogous methacrylate monomers. It will be appreciated, however, that alkyl methacrylates generally yield copolymers having higher Tg's than their alkyl acrylate counterparts. Therefore, when alkyl methacrylates are used, they are employed in small quantities only. As a general rule of thumb, the alkyl methacrylates comprise no more than about 15% of the total weight of all monomers.

The non-CAP polymer(s) include one or more reactive functional groups as described herein in association with the CAPs. However, the one or more reactive functional groups can be incorporated along the polymer chain or backbone in a non-structured or random or non-ordered manner.

Representative and non-limiting examples of ranges of glass transition temperatures (Tg) for the non-CAP polymers typically are from about −60° C. to about −35° C. However, it will be appreciated that the polymers of the present subject matter can exhibit Tg's outside of this range such as less than −60° C. and/or greater than −35° C.

It is also contemplated that the present subject matter may include combinations or blends of CAPs and non-CAPs.

Methods

In many embodiments, the present subject matter provides methods of forming an adhesive. The methods comprise providing a composition including at least one monomer having one or more ethylenically unsaturated bonds, a first actinic radiation initiator, and a second actinic radiation initiator, wherein the second initiator is substantially non-photoactive at activation wavelength(s) of the first initiator. The methods also comprise at least partially polymerizing the composition by exposing the composition to radiation having wavelengths corresponding to the activation wavelength(s) of the first initiator. The methods additionally comprise at least partially crosslinking the composition to thereby form the adhesive by exposing the composition to radiation having wavelengths corresponding to the activation wavelength(s) of the second initiator. In these methods the composition is free of solvents.

In still other embodiments, the present subject matter provides additional methods of forming an adhesive. The methods comprise providing a composition including at least one monomer, a first actinic radiation initiator, and a second actinic radiation initiator, wherein the second initiator is substantially non-photoactive at activation wavelength(s) of the first initiator. The methods also comprise at least partially polymerizing the composition by exposing the composition to radiation having wavelengths corresponding to the activation wavelength(s) of the first initiator. The methods additionally comprise at least partially crosslinking the composition to thereby form the adhesive by exposing the composition to radiation having wavelengths corresponding to the activation wavelength(s) of the second initiator. At least one of the first and the second initiators is a polymer having a photoinitiator moiety along the polymer backbone.

The present subject matter also provides methods of forming a melt processable, actinic radiation polymerizable and crosslinkable adhesive. In many embodiments, the methods utilize controlled architecture polymers that include at least one reactive functional group. In certain embodiments, at least 80% of the reactive functional groups are located within terminal ends of the polymer. The methods also comprise providing two or more initiators as described herein. The methods additionally comprise blending the polymers, which as noted may be controlled architecture polymers, with the initiators to thereby form a pre-adhesive composition.

The present subject matter also provides methods of forming actinic radiation polymerizable and crosslinkable melt adhesives using non-CAP based polymers as described herein. In these embodiments, the methods comprise providing nonstructured polymers that include one or more reactive functional groups. The methods also comprise providing two or more initiators capable of polymerizing and crosslinking the composition. The methods also comprise blending the polymers with the initiators to thereby form a pre-adhesive composition. The methods additionally comprise exposing the composition to actinic radiation for a time period and at an intensity in a first stage sufficient to at least partially polymerize the composition. The methods also comprise exposing the composition for a time period and at an intensity in a second stage sufficient to crosslink the composition and thereby form the adhesive.

The present subject matter adhesives or compositions are polymerized and/or crosslinked by exposure to actinic radiation, and particularly ultraviolet (UV) radiation or near UV radiation. As previously noted, electron beam radiation can also be used. As will be appreciated, sufficient exposure to such radiation causes polymerization and/or crosslinking involving various functional groups incorporated in the polymers and in certain embodiments the CAPs.

Use of the two stage methods described herein enable formation of a pre-adhesive formulation that can be further processed by subsequent or additional exposure to actinic radiation and particularly UV radiation. Thus, an initial batch or a desired amount of pre-adhesive can be polymerized or at least partially polymerized in bulk and then stored or held for later application or coating to a substrate of interest.

After the adhesive is coated on a substrate at a desired coat weight, the coated substrate is irradiated with actinic radiation and particularly UV radiation to yield a crosslinked adhesive and in many embodiments a pressure sensitive adhesive having high cohesive strength at room and elevated temperatures. A variety of UV light sources are known, including low, high, and medium pressure mercury lamps, which emit over a wide range of wavelengths. Most pigmented and unpigmented adhesives can be readily cured using a medium pressure mercury lamp, which has emission bands ranging from about 240 to about 410 nanometers. Alternatively, UV sources that emit over a more narrow range of wavelengths can be used if desired, so long as the emission spectrum of the source overlaps with the absorption spectrum of the initiator(s) employed within the adhesive. Where the adhesive is pigmented with titanium dioxide or similar pigments, the preferred initiator has absorption bands in the near UV region, and a UV source that emits at least in that region is employed.

As noted, in particular embodiments, the methods of the present subject matter involve the use of one or both of the initiators being in the form of polymerizable monomers. The methods involve incorporation and/or polymerization of the first and/or second initiators into the polymers constituting the adhesive.

Figure 5:
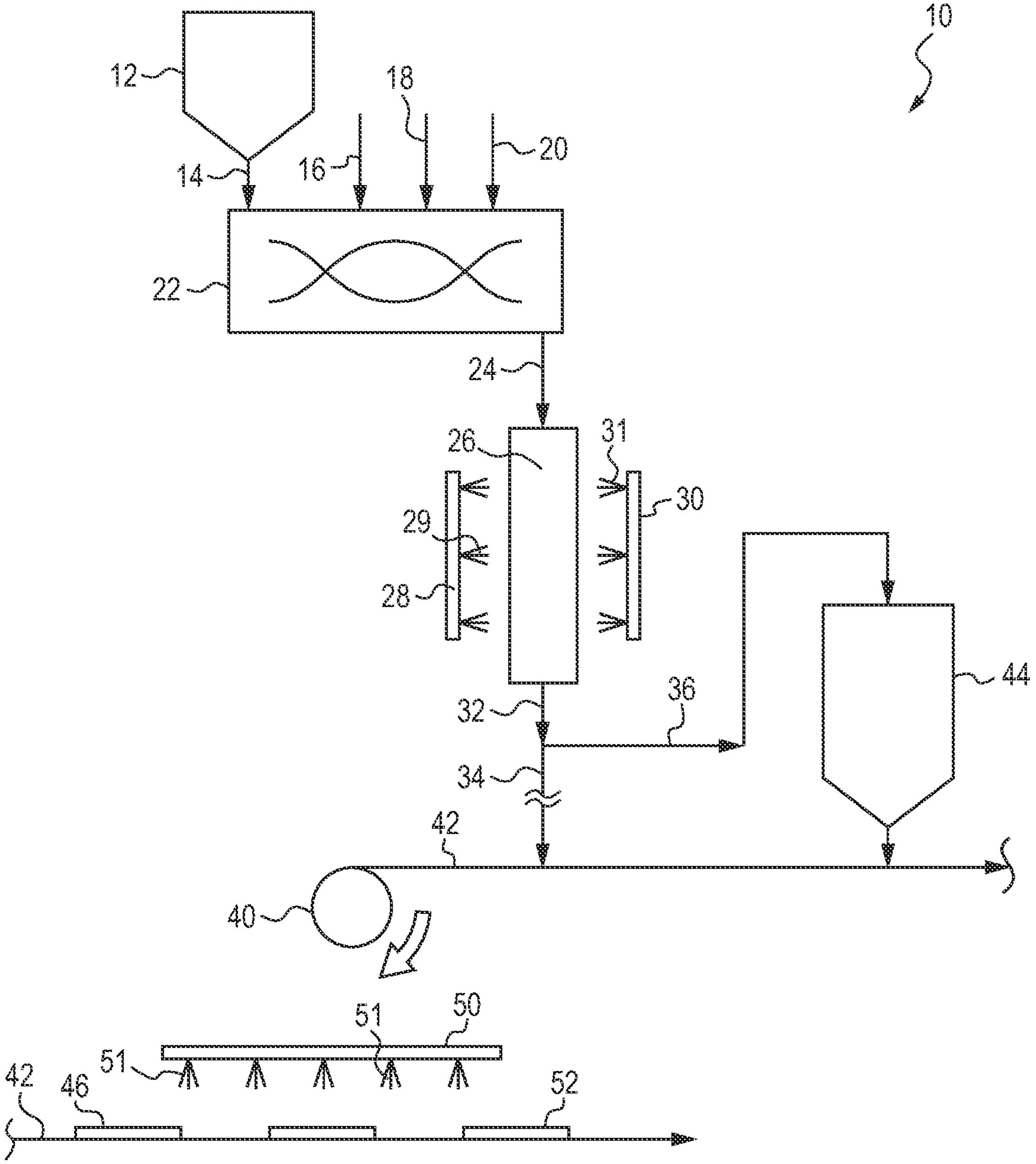
FIG. 5 is a process schematic diagram showing a representative process and system for producing an adhesive in accordance with the present subject matter.

FIG. 5 is a process schematic diagram depicting a representative process and system 10 for producing an adhesive and polymerizing and crosslinking the adhesive in accordance with the present subject matter. The system 10 generally comprises a dispenser or heater 12 for introducing one or more adhesives, polymers, and/or monomers via feed line 14 to a blender or mixer 22. Also provided are additional feed lines 16, 18, and 20 which can be for selectively metering desired amounts of a first initiator, a second initiator, and ancillary components or other additives to the mixer 22. It will be appreciated that the first and/or second initiator can be introduced in the form of polymerizable monomers which are polymerized with or separately from monomer(s) that form the adhesive.

After appropriate mixing of the adhesive, polymers and/or monomers, photoinitiators, and optional components, the resulting pre-adhesive is directed through line 24 to a reactor 26 which can be in the form of a tube reactor for example. The reactor 26 can be in a variety of different forms however typically defines an interior region for receiving adhesive or pre-adhesive. The reactor 26 is configured to allow actinic radiation such as UV radiation to enter the interior of the reactor from one or more radiation sources as described herein. The adhesive is directed through the reactor 26 and exposed in a first stage to actinic radiation from UV emitters 28, 30 that emit UV light or radiation shown as rays 29, 31 for example, having a wavelength corresponding to an activation wavelength of one of the initiators and typically the first initiator. The flow rate, i.e., residence time of adhesive in the reactor 26; intensity of the UV light; and other factors are adjusted to produce a partially or fully polymerized adhesive exiting the reactor 26 via line 32. Polymerization between monomer(s) primarily occurs in the reactor 26.

The adhesive in line 32 may be directly deposited or applied to one or more substrates on a moving web 42 (typically driven by rotating roller 40) via line 34, or directed via line 36 to a storage unit 44 for additional processing and/or subsequent application.

Upon deposition of the adhesive shown in FIG. 5 as regions 46, the adhesive typically on the moving web 42, is irradiated by another UV emitter in a second stage 50 that directs UV rays 51 upon the regions 46 to crosslink the adhesive. Crosslinked adhesive 52 results.

In particular embodiments, two or more conventional medium pressure mercury lamps can be used having spectral emissions from about 240 to about 410 nanometers, and light intensities of from about 5 to 10 $kWatts/m^2$. Nonlimiting examples of UV light intensities for processing adhesives of the present subject matter can range from about 0.1 to about 100 $kWatts/m^2$, in certain embodiments from 1 to 50 $kWatts/m^2$, and in particular embodiments from 1 to 20 $kWatts/m^2$. The coated substrate is carried on a moving web under or near the UV radiation source, where the web temperature may range from 45° C. to 125° C. The dosage of UV radiation received by the coated adhesive film is controlled by adjusting the UV lamp intensity and/or the web speed. Nonlimiting examples of time periods for processing adhesives of the present subject matter are typically less than 60 minutes, more typically less than 10 minutes, in many embodiments less than 1 minute, and in particular embodiments less than 10 seconds.

Upon exposing adhesive to the noted conditions, if the adhesive includes CAPs, the adhesive then includes an ETLN. As previously described, the ETLN adhesives of the present subject matter exhibit an array of advantages and benefits and particularly when compared to non-architecture polymers which produce randomly crosslinked networks.

Figure 6:
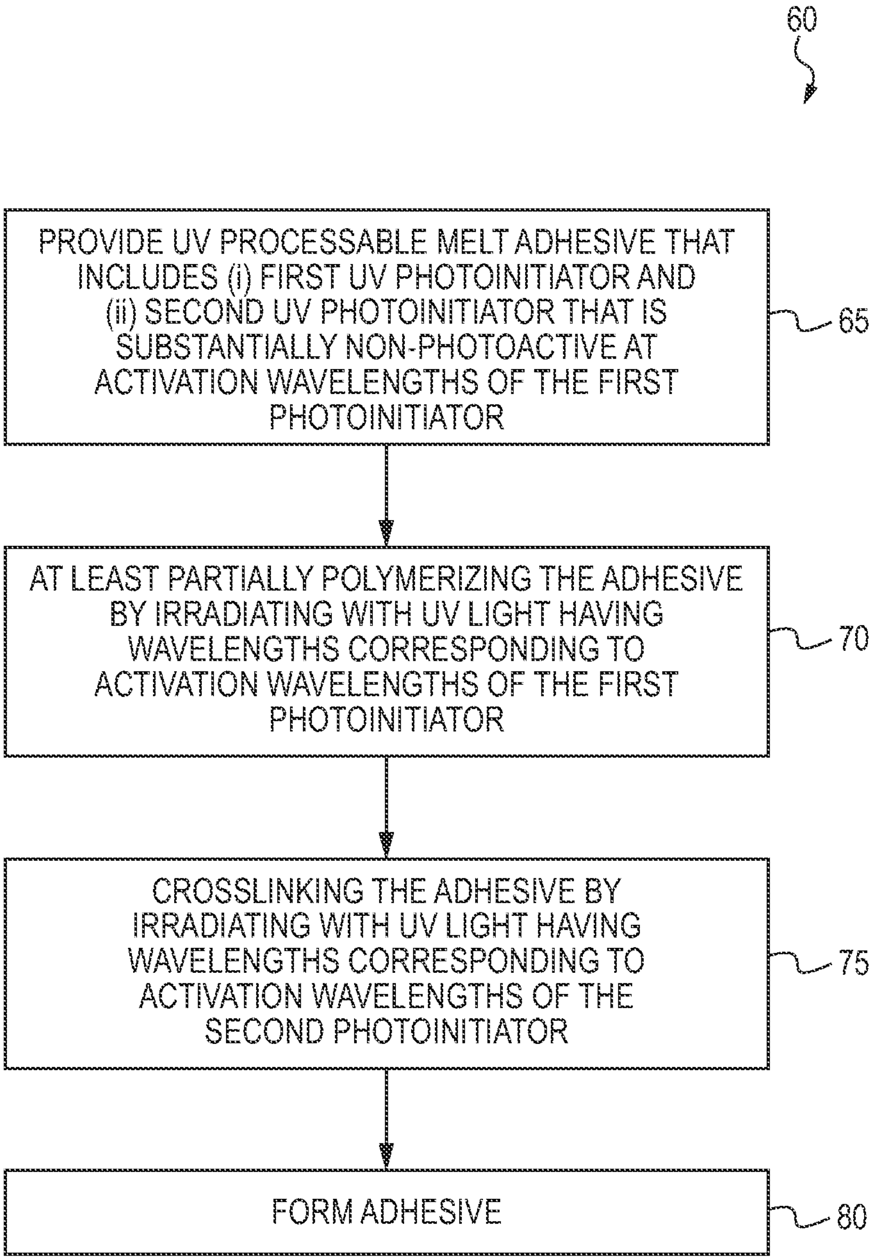
FIG. 6 is a schematic flow chart of a method for forming an adhesive in accordance with the present subject matter.

Specifically, as shown in FIG. 6, a method 60 includes providing a melt adhesive having (i) a first UV photoinitiator for bulk curing of the adhesive, and (ii) a second UV photoinitiator for on-web crosslinking of the adhesive. The second photoinitiator is substantially non-photoactive at activation wavelengths of the first photoinitiator. This is depicted as one or more operations 65 in FIG. 6. The methods also include at least partially curing the adhesive by irradiating the adhesive with UV light having wavelengths corresponding to the activation wavelengths of the first photoinitiator. This is shown as one or more operations 70 in FIG. 6. The methods additionally include applying the at least partially cured adhesive to a surface of interest. And, the methods include crosslinking the adhesive shown as operation(s) 75 by irradiating the adhesive with UV light having wavelengths corresponding to the activation wavelengths of the second photoinitiator, to thereby form the adhesive at 80. It will be appreciated that the present subject matter includes the use of initiators activated by exposure to electron beam radiation instead of, or in addition to, either or both of the first and second UV photoinitiator(s).

As will be understood, during conversion of the composition(s) of the present subject matter from a pre-adhesive to a pressure sensitive adhesive, in many embodiments, the modulus of the composition changes while the glass transition temperature (Tg) does not change or remains substantially the same.

Optical Filters

Another aspect of the present subject matter involves selective exposure of UV radiation having a desired wavelength or range of wavelengths to one or both of the UV photoinitiators at particular times or process phases. For example, in one embodiment of the present subject matter, one or more optical filters can be used to selectively filter and/or block UV radiation of particular wavelength(s). Using this technique, adhesive or pre-adhesive can be exposed to a UV radiation source that activates the first UV photoinitiator yet which does not activate the second photoinitiator. In this version of the present subject matter, one or more optical filters are used to selectively block UV radiation having wavelength(s) corresponding to the activation wavelength(s) of the second photoinitiator. The present subject matter also includes the use of optical filters to selectively filter and/or block particular radiation wavelength(s) that correspond to the activation wavelength(s) of the first photoinitiator.

A wide array of materials and equipment can be used to provide the noted optical filter(s). The optical filter(s) are positioned between the UV radiation source and the adhesive or pre-adhesive. Referring to FIG. 5 again, the one or more optical filters can be disposed or otherwise positioned between the UV emitter 28 and the reactor 26 so that the UV radiation 29 passes through the filters. Similarly, one or more optical filters could be positioned between region(s) 46 and the second stage 50. In many embodiments, the optical filters include particular polymeric layers, lenses, and/or films that are formulated to allow passage of certain wavelengths and block passage of other wavelengths. Nonlimiting examples of such materials include polycarbonates such as those commercially available under the LEXAN® designation, certain polyethylene terephthalates, certain polymethyl methacrylates (PMMAs), and combinations thereof. It is also contemplated to utilize one or more dichroic glasses as the optical filters described herein. It will be understood that the present subject matter is not limited to any of these particular materials. Instead, the subject matter includes a wide array of materials and assemblies for selectively filtering and/or enabling passage of electromagnetic radiation having desired wavelength(s) to the adhesive or pre-adhesive.

The optical filter(s) can be configured to block or otherwise prevent passage of electromagnetic radiation and in particular UV radiation having particular wavelength(s). In many embodiments, the optical filters block passage of UV radiation having wavelength(s) corresponding to the activation wavelength(s) of the second photoinitiator. As previously noted, in certain embodiments of the present subject matter the activation wavelengths of the second photoinitiator are within a range of from 100 nm to 500 nm, and particularly from 200 nm to 375 nm.

The optical filter(s) can be configured such that they can be selectively positioned between one or more light sources and the adhesive or process component(s) containing the adhesive or pre-adhesive such as a reactor. The optical filter(s) can also be configured so that the filter(s) can be moved to thereby allow passage of light in an unfiltered or unblocked manner.

If multiple light sources are used, the present subject matter includes the use of optical filter(s) associated with some or all of the light sources. The present subject matter includes a wide array of process components and system configurations.

Articles

The present subject matter provides a wide array of articles that include the noted compositions, pre-adhesives, and/or adhesives. Examples of such articles include adhesive tapes including double sided and single sided tapes; label stock; label constructions; packaging products and assemblies including food packages, packaging for household goods and industrial goods and particularly reclosable packages; and other items.

Figure 7:
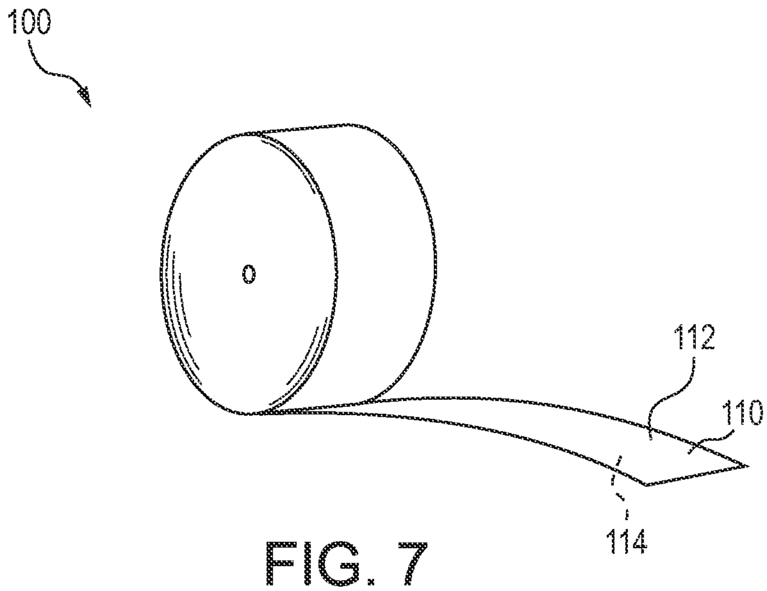
FIG. 7 is a schematic illustration of a tape article including an adhesive in accordance with the present subject matter.

FIG. 7 illustrates a tape article 100 in accordance with an embodiment of the present subject matter. The tape article 100 is shown in a roll form, however, it will be appreciated that the tape could be in a flat, sheet, or Z-fold form. The tape article 100 generally includes a substrate 110 defining a first face 112 and an oppositely directed second face 114. The tape 100 includes a layer or region of an adhesive as described herein disposed on one or both faces 112, 114. One or more release liners and/or low surface energy coatings can be used as described in greater detail herein.

Figure 8:
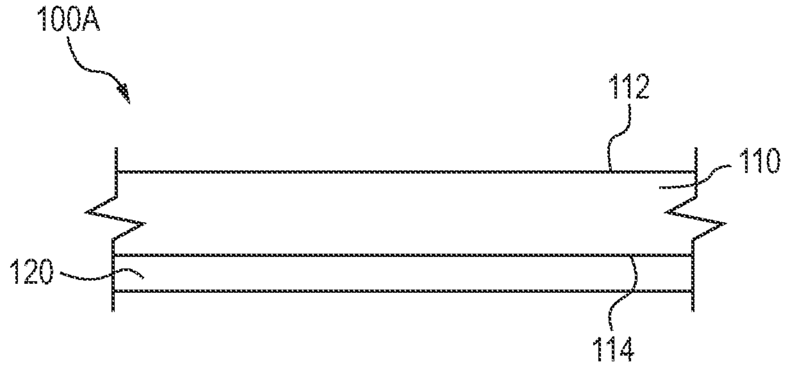
FIG. 8 is a schematic cross sectional view of another tape article in accordance with the present subject matter.

FIG. 8 is a schematic cross sectional view of a tape 100A comprising a substrate 110 defining a first face 112 and an oppositely directed second face 114. The tape 100A also comprises a layer or region of an adhesive 120 disposed on one of the faces such as for example face 114. One or more low surface energy coatings can be disposed on the face 112 of the substrate 110.

Figure 9:
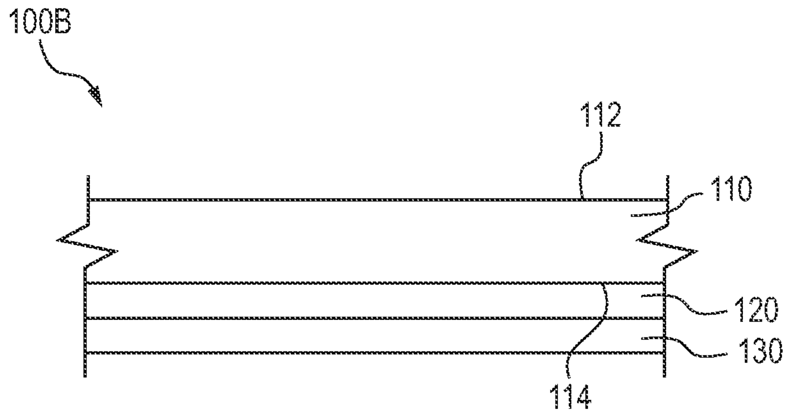
FIG. 9 is a schematic cross sectional view of another tape article in accordance with the present subject matter.

FIG. 9 is a schematic cross sectional view of a tape 100B comprising a substrate 110 defining a first face 112 and an oppositely directed second face 114. The tape 100B also comprises a layer or region of an adhesive 120 disposed on one of the faces such as for example face 114. The tape 100B also comprises a release liner 130 covering the adhesive 120. One or more low surface energy coatings can be disposed on the face 112 of the substrate 110.

Figure 10:
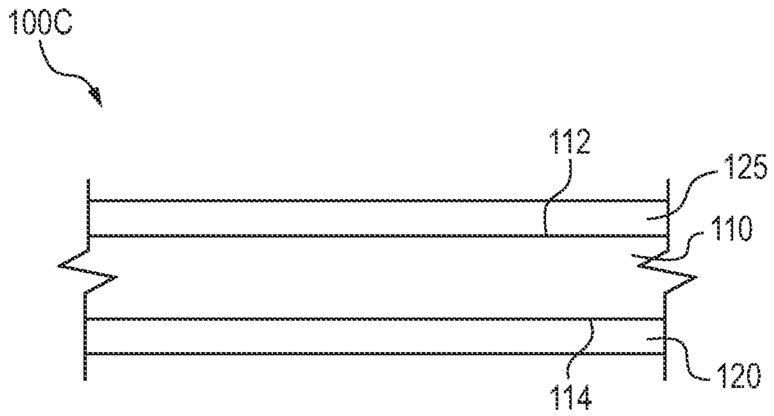
FIG. 10 is a schematic cross sectional view of another tape article in accordance with the present subject matter.

FIG. 10 is a schematic cross sectional view of a tape 100C comprising a substrate 110 defining a first face 112 and an oppositely directed second face 114. The tape 100C also comprises a first layer or region of an adhesive 120 disposed on one of the faces such as for example face 114. The tape 100B also comprises a second layer or region of an adhesive 125 disposed on the face 112 of the substrate 110.

Figure 11:
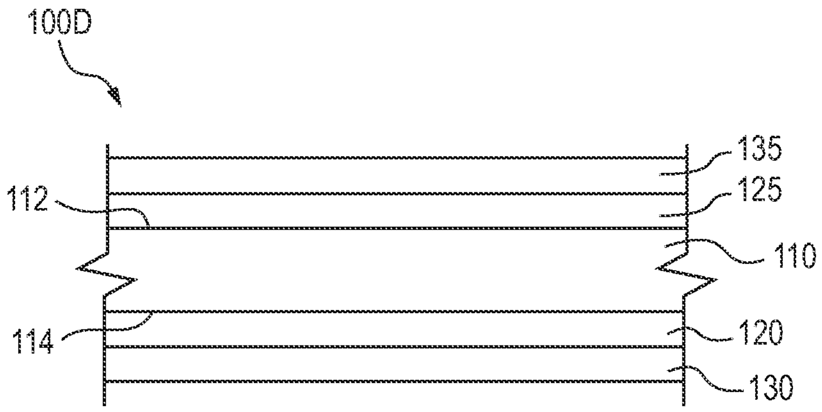
FIG. 11 is a schematic cross sectional view of another tape article in accordance with the present subject matter.

FIG. 11 is a schematic cross sectional view of a tape 100D comprising a substrate 110 defining a first face 112 and an oppositely directed second face 114. The tape 100D also comprises a first layer or region of an adhesive 120 disposed on one of the faces such as for example face 114. The tape 100D also comprises a second layer or region of an adhesive 125 on the face 112. The tape 100D also comprises a first release liner 130 covering the adhesive 120. And, the tape 100D additionally comprises a second release liner 135 covering the adhesive 125.

Figure 12:
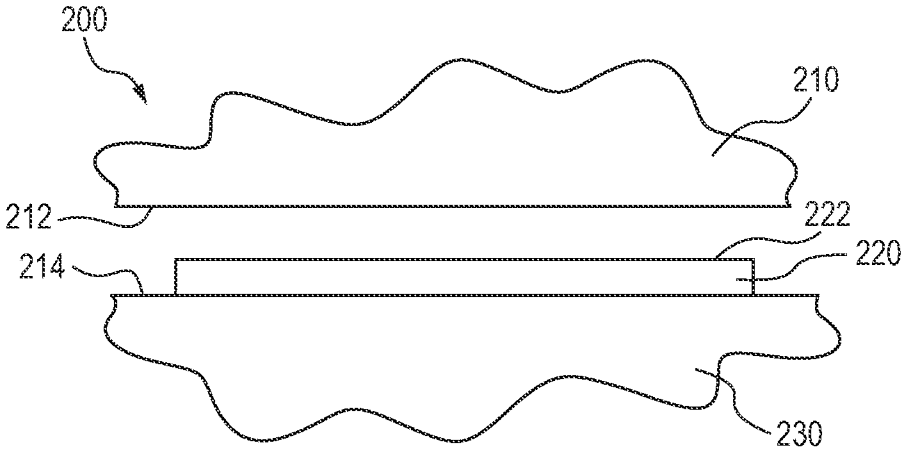
FIG. 12 is a schematic cross sectional view of a sealing or closure assembly including a region of an adhesive in accordance with the present subject matter.

FIG. 12 is a schematic cross sectional view of a sealing, closure, or reclosure assembly 200 in accordance with the present subject matter. This assembly comprises a first substrate 210 defining a first substrate face 212, a second substrate 230 defining a second substrate face 214, and one or more layers or regions of an adhesive 220 defining an adhesive face 222. The adhesive 220 is disposed on one or both substrate faces 212, 214. The adhesive 220 serves to seal and/or adhere the substrates 210, 230 together upon contact between the adhesive face 222 and the substrate face 212. As will be understood, the adhesive 220 is any of the adhesives described herein. The assembly 200 can be utilized in association with and/or incorporated in a wide array of packaging products including for example food packages, packages for household goods, industrial goods packages, and in particular recloseable packages.

The adhesive layer may have a thickness as desired for a particular purpose or intended use. In one embodiment, the adhesive layer may have a thickness from about 10 to about 125, or from about 10 to about 75, or from about 10 to about 50 microns. In one embodiment, the coat weight of the adhesive may be in the range of about 10 to about 50 grams per square meter (gsm), and in one embodiment about 20 to about 35 gsm.

Release liners for use in the present subject matter may be those known in the art or those later discovered. In general, suitable release liners include, but are not limited to, polyethylene coated papers with a commercial silicone release coating, polyethylene coated polyethylene terephthalate films with a commercial silicone release coating, or cast polypropylene films that can be embossed with a pattern or patterns while making such films, and thereafter coated with a commercial silicone release coating. An exemplary release liner is kraft paper which has a coating of low density polyethylene on the front side with a silicone release coating and a coating of high density polyethylene or polypropylene on the back side. Other release liners known in the art are also suitable as long as they are selected for their release characteristics relative to the pressure sensitive adhesive chosen for use in the adhesive article, that is, the adhesive will have a greater affinity for the face stock than the liner.

As previously noted, one or more low surface energy coatings can be used in the articles utilizing the adhesives described herein. For example, for rolled tape products it may be desirable to provide a coating of a low surface energy agent along a rear face of a substrate or tape component that contacts the adhesive. Nonlimiting examples of low surface energy coatings include silicone agents, polypropylene or other polyolefins, certain fluorocarbons, and certain fatty acid esters.

A benefit of particular adhesives of the present subject matter involves maintenance of performance criteria upon continued exposure to UV radiation. For example, a disadvantage of many conventional UV cured, randomly crosslinked adhesive networks is that additional UV exposure results in additional crosslinking. This may in turn result in undesirable changes in the adhesive and/or its performance. Specifically, this may be undesirable for clear or transparent labels that are UV printed downstream. In contrast, many embodiments of the present subject matter adhesives do not exhibit performance changes upon additional UV exposure.

Additional Aspects

Figure 13:
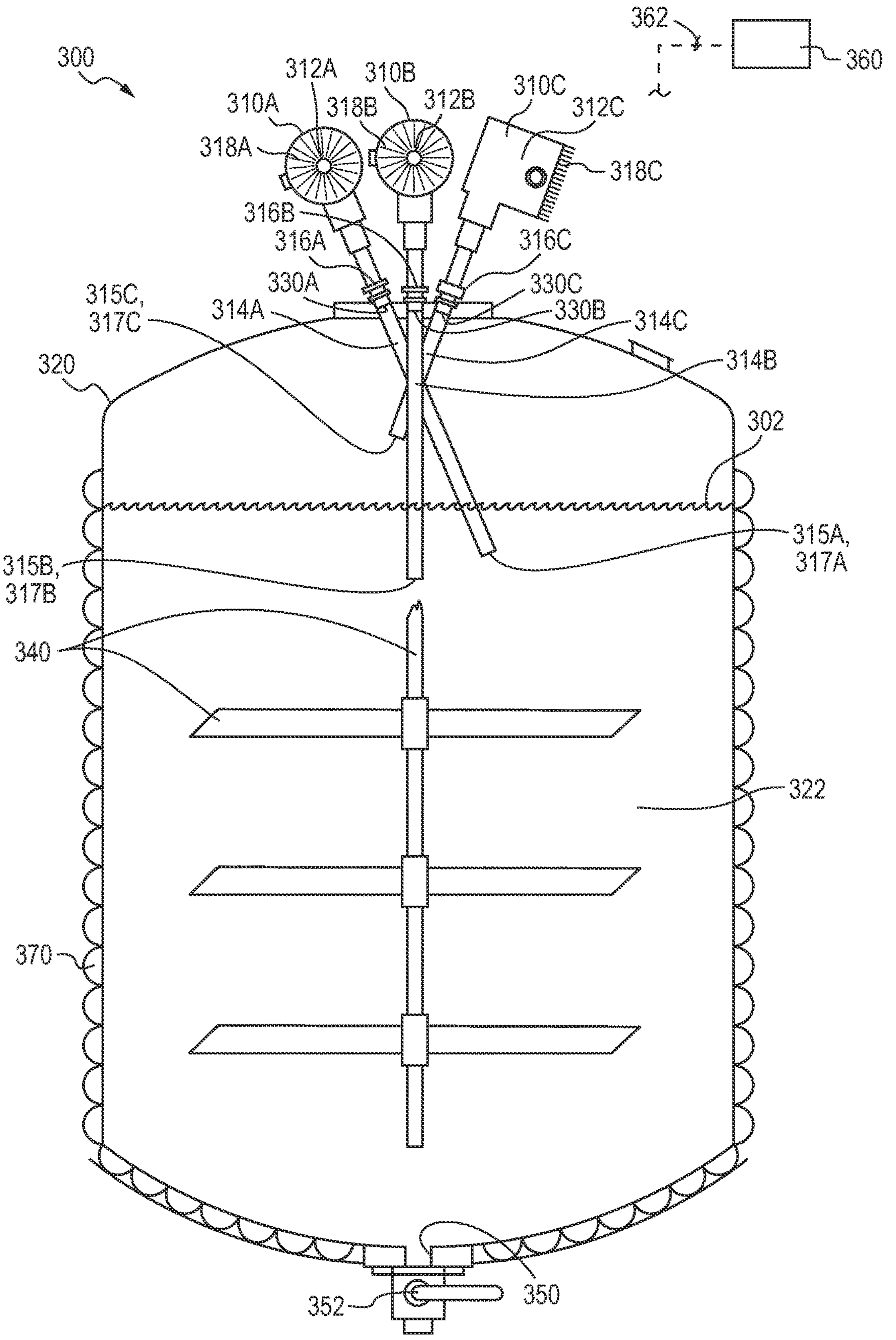
FIG. 13 is a schematic illustration of an embodiment of an apparatus for polymerizing and/or crosslinking adhesives in accordance with the present subject matter.

FIG. 13 schematically illustrates an apparatus for polymerizing or crosslinking adhesives by exposure to actinic radiation using one or more light emitting probes. Specific wavelengths of radiation emitted at specific angles and heights relative to an upper surface of an adhesive or pre-adhesive contained within the apparatus are used to achieve varying polymer properties. FIG. 13 shows three of four positions of irradiation: surface, angled surface, sub-surface, and angled sub-surface. Probes can be attached to the side, top, or bottom of a reaction vessel and are held in place via pressure rated sealing and locking collars. This provides further flexibility to the penetration depth of each probe. A typical configuration for individual probes is one in which each probe comprises a pressure rated light tube, LED emitter, and a Class 1/Division 1 enclosure with integrated heat sink. The light controller/driver is located remotely. The probe is constructed with a smoothed, polished interior wall that reflects radiation from the source and emits the radiation through the tip of the probe within the reaction vessel. Materials that are transparent to the radiation wavelengths are used at the probe's tip. Nonlimiting examples of such materials include glass, quartz, sapphire, and similar materials. In many embodiments, the complete apparatus is certified to meet or exceed pressure and temperature ratings of the chosen reaction vessel. In addition to LED, other light sources can be considered along with other ancillary apparatus components such as power source, cooling provisions and the like.

Specifically, referring to FIG. 13, an apparatus 300 for polymerizing and/or crosslinking an adhesive or pre-adhesive composition is shown. The apparatus comprises a reaction vessel 320 defining an interior chamber 322 for the composition. The vessel 320 typically includes stirring or mixing provisions 340, one or more drain ports 350, and associated valving 352 to govern entry and exit of flow(s) to the vessel 320. An optional heating and/or cooling jacket 370 may be provided along exterior regions of the vessel 320. The apparatus 300 also comprises one or more probe assemblies 310 engaged with the reaction vessel 320 via collar(s) 330. The collar 330 provides access to the interior chamber 322 of the vessel 320 and is located along an upper region of the vessel 320 typically within a top wall of the vessel 320. The collar 320 includes provisions for releasably engaging a probe assembly 310 and supporting the probe assembly relative to the vessel 320. The probe assembly 310 includes an emitter 312, a light tube 314 extending from the emitter, optional heat sink provisions 318 associated with the emitter 312, and adjustable positioning provisions 316. The light tube 314 defines a distal end 315 opposite the emitter 312. In many embodiments, a probe assembly 310 is disposed relative to the reaction vessel 320 such that the emitter 312 is positioned above the vessel 320, and the light tube 314 extends into the interior chamber 322 of the vessel 320 through the collar 330. The adjustable positioning provisions 316 are engaged or associated with the light tube 314 and serve to govern and/or maintain a desired position of the light tube 314 within the chamber 322. FIG. 13 depicts various positions of the light tube 314 relative to the vessel 320 and specifically, an upper surface 302 of an adhesive or pre-adhesive composition contained within the vessel 320. For example, probe assembly 310A includes an emitter 312A, a light tube 314A extending into the interior chamber 322 of the vessel 320, and adjustable positioning provisions 316A. Probe assembly 310A is depicted in an angled sub-surface position as the light tube 314A is at a non-vertical orientation and the distal end 315A of the light tube 314A is below the upper surface 302 of the composition contained within the vessel 320. Probe assembly 310B includes an emitter 312B, a light tube 314B extending into the chamber 322, and adjustable positioning provisions 316B. Probe assembly 310B is depicted in sub-surface position as the light tube 314B is at a vertical orientation and the distal end 315B of the light tube 314B is below the upper surface 302. Probe assembly 310C includes an emitter 312C, a light tube 314C extending into the chamber 322, and adjustable positioning provisions 316C. Probe assembly 310C is shown in an angled surface position as the light tube 314C is at a non-vertical orientation and the distal end 315C of the light tube 314C is above the upper surface 302. As will be appreciated, a surface position for a probe assembly corresponds to a light tube oriented at a vertical position and having a distal end of the light tube positioned above the upper surface.

The apparatus 300 can include a single probe assembly or multiple probe assemblies. And, the probe assemblies can be located proximate one another as shown in FIG. 13, or the probe assemblies can be located along different regions of the vessel such as one or two or more located along a top region, and one or two or more located along side region(s) of the vessel.

The emitter 312 of a probe assembly 310 typically includes one or more emitter(s) of actinic radiation such as a light source. The emitter 312 can optionally include heat dissipating provisions such as an integrated heat sink 318 located along exterior region(s) of the emitter 312. As will be understood each emitter is in communication with a signal and/or power unit 360. One or more signal/power communication(s) 362 extend between the emitter 312 and the signal/power unit 360.

In certain embodiments, the interior wall of a light tube, such as light tubes 314A, 314B, and/or 314C, provides a smooth, polished surface that promotes reflection of light emitted from the emitter. And, in many embodiments, one or more transparent covers 317 are provided at or proximate the distal end 315 of the light tube 314. As noted, the cover is transparent or substantially transparent to the passage of light emitted from the emitter and reflected along a length or length portion of the light tube. The term "substantially transparent" as used herein refers to the cover having optical properties that enable at least 90% of light emitted from the emitter 312 and reflected along the light tube, to pass through the cover 317.

An advantage of mounting a probe in a nozzle in the top (also known as "head of the vessel") is that the probe can be removed without draining/releasing the contents of the vessel. Another advantage of mounting a probe above the upper surface 302 is that on the outside vertical walls and bottom walls of the vessel, such walls are typically covered with a jackets (i.e., "welded half-pipe") to provide cooling or heating the contents via thermal conduction. For example, to cool an exothermic reaction, cold water is typically circulated through a half-pipe jacket. The presence of the jacket for cooling limits the amount of surface area available and complicates the installation of the probe through the sidewalls and bottom wall.

Another mode of introducing actinic radiation via a probe is through a port, collar, or nozzle incorporated into the vessel below the surface of the liquid, either via the side wall or the bottom wall of the vessel (see FIG. 14). This is in contrast to FIG. 13, in which the collar is mounted on the top wall of the vessel. An advantage of mounting the probe in the bottom wall is that for any fillage of the vessel, the probe is always submersed. The distance between the probe tip and the liquid is essentially zero, independent of batch size.

Figure 14:
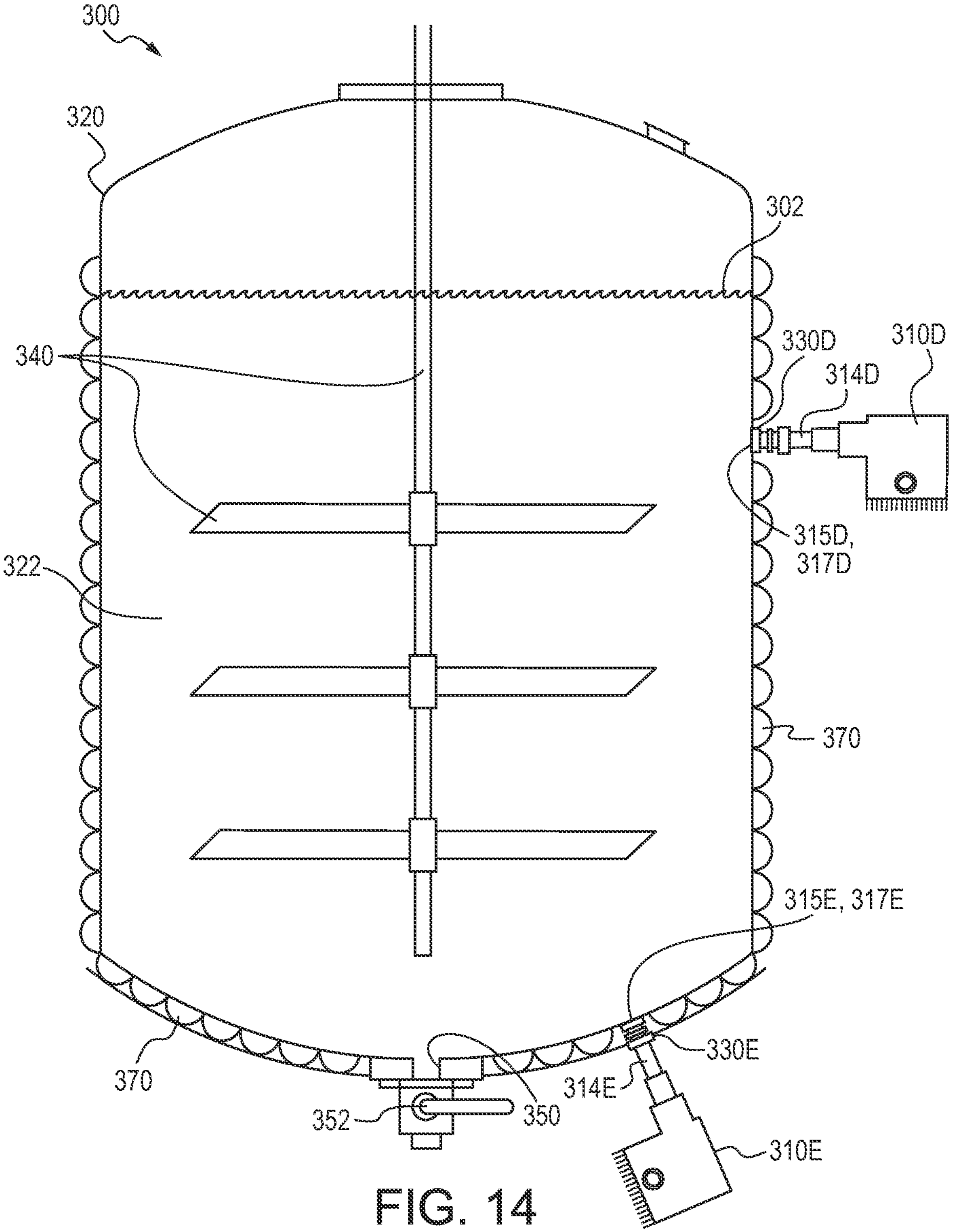
FIG. 14 is a schematic illustration of another version of an apparatus for polymerizing and/or crosslinking adhesives in accordance with the present subject matter.

Specifically, referring to FIG. 14, another version of the apparatus 300 previously described in association with FIG. 13 is shown. In this version, a probe assembly 310D is located along a side wall of the reaction vessel 320, and a probe assembly 310E is located along a bottom wall of the vessel 320. Each probe assembly 310D and 310E is engaged with the vessel 320 by a corresponding collar 330D and 330E. In the particular version shown in FIG. 14, the distal ends 315D and 315E of the light tubes 314D and 314E are flush or substantially flush with an interior surface of the vessel wall. As previously described, transparent covers 317 are typically located at the light tube distal ends, thus, covers 317D and 317E are substantially flush with the interior wall of the vessel 320.

Figure 15:
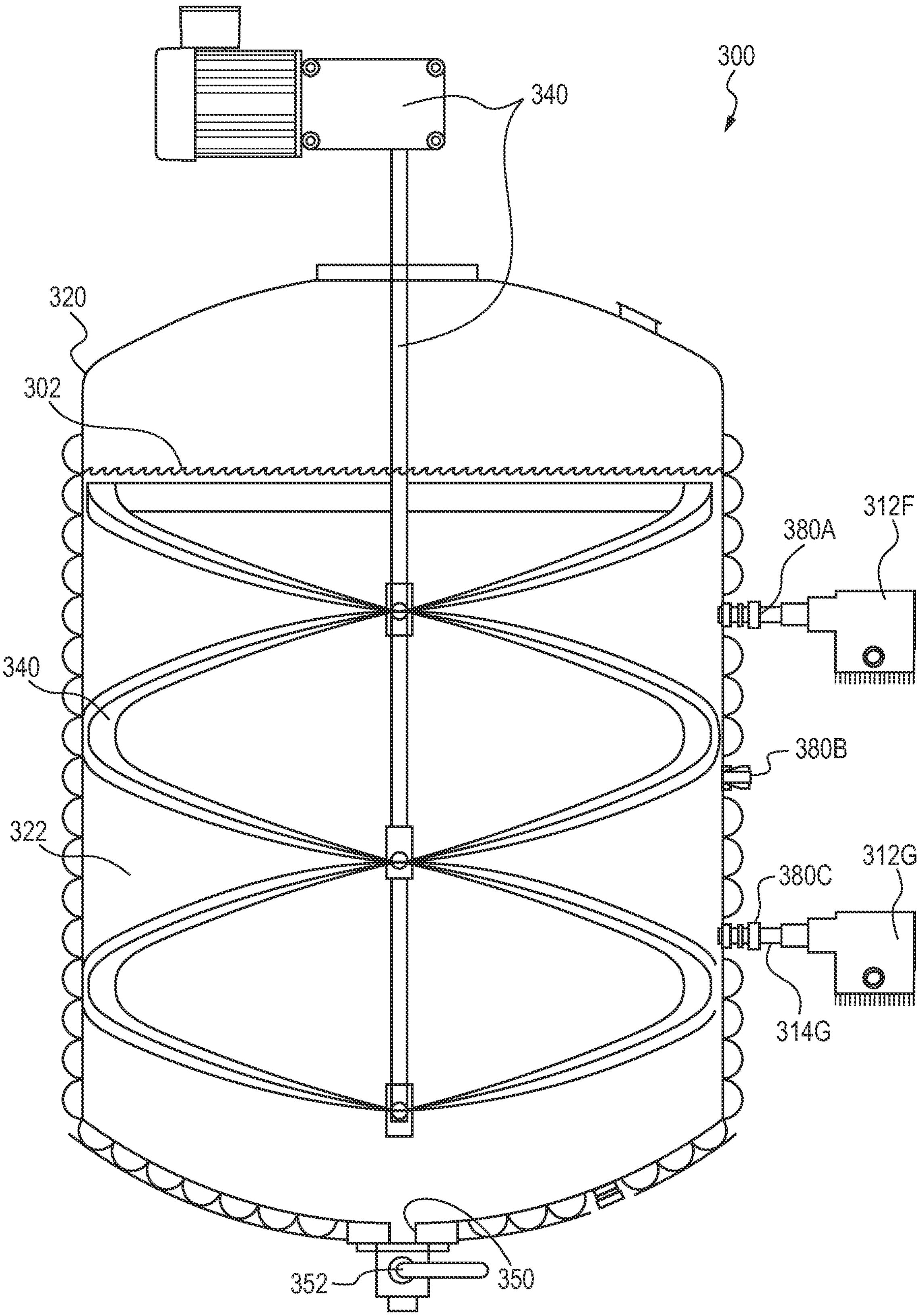
FIG. 15 is a schematic illustration of another version of an apparatus for polymerizing and/or crosslinking adhesives in accordance with the present subject matter.

Yet another mode is to irradiate the contents of the reactor using a sight glass built into the side vessel, instead of installing a probe through a nozzle or port (see FIG. 15). The sight glass is typically flush with the side wall of the vessel. An advantage of having a sight glass flush with the side wall of the vessel is that some vessels have agitator designs that sweep the inside wall of the vessel at a small gap (akin tolerance or distance). A sweeping agitator blade helps promote heat transfer in viscous materials. Also, if the light is causing a reaction to occur near the glass-product interface, the wiping agitator blade promotes the mixing of viscous, reacted product in the irradiated zone with lower viscosity material outside the irradiated zone.

Specifically, FIG. 15 illustrates another version of the apparatus 300. This figure depicts additional aspects of the stirring or mixing provisions 340. As will be understood, many such provisions 340 include a power unit for rotating a shaft generally extending into the interior chamber 322 of the vessel 320. The provisions 340 typically include one or more blades or mixing elements extending from the shaft. In this version, the reaction vessel includes one or more sight glasses 380 incorporated within wall region(s) of the vessel. The sight glass(es) provides visual access to the interior of the vessel. For example, in the version of FIG. 15, a plurality of sight glasses 380 are provided, i.e., sight glasses 380A, 380B, and 380C. One or more emitter(s) such as emitter 312F can be positioned adjacent a sight glass such as sight glass 380A. Emission of light from the emitter 312F passes through the sight glass 380A to irradiate the contents of the vessel 320. In addition or alternatively, one or more emitter(s) such as emitter 312G can be positioned adjacent a sight glass such as sight glass 380C, and a light tube such as light tube 314G can be used to direct light from the emitter 312G to the sight glass 380C for irradiation into the chamber 322 of the vessel 320. One or more transparent covers can be used, however, such is likely not necessary. As will be appreciated, it is desired for many applications that the sight glass is transparent or substantially transparent to passage of light emitted from the emitter.

Figure 16:
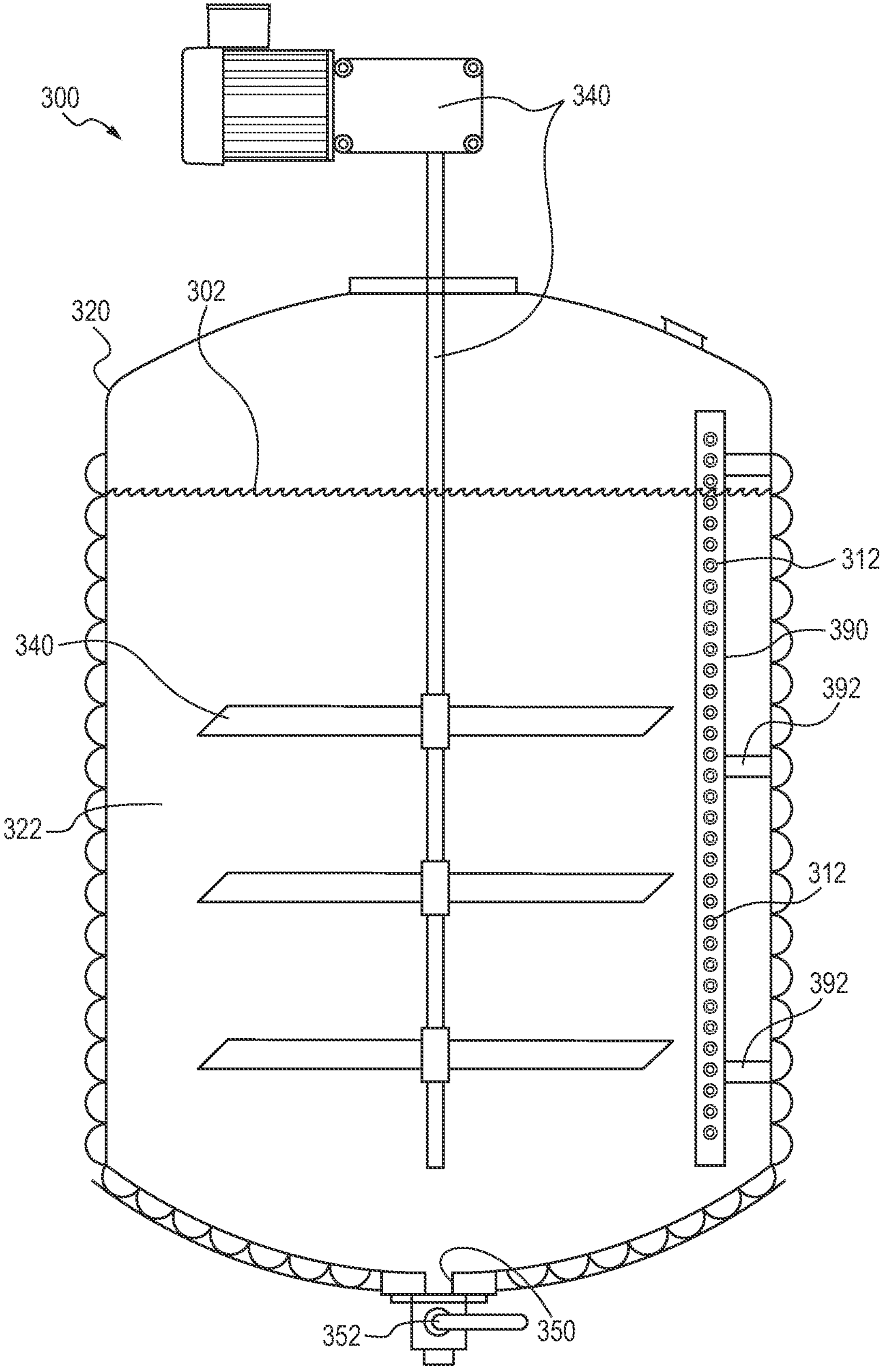
FIG. 16 is a schematic illustration of another version of an apparatus for polymerizing and/or crosslinking adhesives in accordance with the present subject matter.

Still another mode of introducing radiation is to mount a LED or other light source onto a baffle attached to the reactor wall as depicted in FIG. 16. In this vessel type, the contents of the vessel are agitated by a pitched blade turbine. The primary function of the baffle is to divert flow away from the wall of the vessel. If sufficiently strong, the enclosure of the light source could also function as a baffle in addition to being the light source. Alternatively, the light source can be mounted on the front side of the baffle with respect to the rotation of the liquid due to the agitator blade. In all these methods, the irradiated material in front of the source would be constantly renewed to allow reacted viscous material to be thoroughly mixed into the overall reaction mass.

Specifically, referring to FIG. 16, an apparatus 300 is shown having stirring or mixing provisions 340 in the form of a pitched blade turbine. One or more emitters 312 are incorporated in a stationary baffle 390 that is affixed within the interior chamber 322 of the vessel 320. One or more supports 392 attached to the vessel wall can be used to affix the baffle 390 within the vessel 320. It is also contemplated that the baffle(s) can extend from support(s) extending through collars in the wall(s). Although the present subject matter includes baffle(s) 390 that emit light in all directions from the baffle, in certain versions a uni-directional or substantially so, light emission configuration is used. Typically, such baffles emit light from a single face of the baffle. That is, the uni-directional light emission baffle 390 is positioned within the interior chamber 322 of the vessel 320 such that light emitted from the baffle 390 is directed toward approaching flow(s) of composition resulting from movement of the blade(s). However, it will be understood that the present subject matter includes versions in which the baffle(s) emits light directed toward flow(s) of composition traveling away from the baffle. The baffle(s) can be self-contained and include batteries and electronics for powering the emitter(s), and/or receive signals and/or power remotely. Although a pitched blade turbine is preferred for certain applications, the present subject matter includes other types of stirring/mixing provisions.

An advantage of subsurface irradiance is that the reaction zone starts immediately at the probe tip and penetrates a certain distance defined as the "penetration depth". The "penetration depth" depth depends upon optical density and on the nature of the material, the applied irradiance, the spectral output, and the photoinitiator and its concentration. If the light source is positioned above the surface and particulate(s) exist in the headspace above the liquid, the particulate matter may interact with the incoming light. In particular, if liquid from the reaction mass is dispersed into the vapor space and forms an aerosol, then polymer may form in the vapor phase. This is undesirable because the reaction is no longer homogeneous and also fouls the reactor headspace and may foul the optic interface and attenuate the irradiation. Also, the operator can not view the reaction as well with a dirty sight glass. Also, clean up of the vessel is difficult after the reaction.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or compositions. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. An apparatus for polymerizing and/or crosslinking an adhesive or pre-adhesive composition, the apparatus comprising:

a reaction vessel defining an interior chamber and comprising at least one collar providing access to the interior chamber;

at least one probe assembly supported by the collar, the probe assembly comprising (i) an emitter for emitting light that polymerizes and/or crosslinks the composition, (ii) a light tube extending from the emitter and at least partially disposed within the interior chamber of the reaction vessel, (iii) adjustable positioning provisions for governing position of the light tube within the interior chamber of the reaction vessel, and (iv) a cover disposed at a distal end of the light tube, wherein the cover is transparent or substantially transparent to passage of light emitted from the emitter.

2. The apparatus of claim 1 wherein the probe assembly is positionable to at least one position selected from the group consisting of a surface position, an angled surface position, a sub-surface position, and an angled sub-surface position.

3. The apparatus of claim 1 wherein the apparatus comprises a single probe assembly.

4. The apparatus of claim 1 wherein the apparatus comprises multiple probe assemblies.

5. The apparatus of claim 1 wherein the collar and at least one probe assembly are located along a top wall of the reaction vessel.

6. The apparatus of claim 1 wherein the collar and at least one probe assembly are located along a side wall of the reaction vessel.

7. The apparatus of claim 1 wherein the collar and at least one probe assembly are located along a bottom wall of the reaction vessel.

8. The apparatus of claim 1 wherein the vessel further comprises mixing provisions.

* * * * *